(12) United States Patent
Richards

(10) Patent No.: US 9,013,590 B2
(45) Date of Patent: Apr. 21, 2015

(54) PIXEL MULTIPLICATION USING CODE SPREAD FUNCTIONS

(71) Applicant: Raytheon Company, Waltham, MA (US)

(72) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 236 days.

(21) Appl. No.: 13/713,159

(22) Filed: Dec. 13, 2012

(65) Prior Publication Data

US 2014/0168458 A1 Jun. 19, 2014

(51) Int. Cl.

| H04N 5/228 | (2006.01) |
|---|---|
| H04N 9/07 | (2006.01) |
| H04N 5/232 | (2006.01) |
| G01B 11/02 | (2006.01) |
| G01B 9/02 | (2006.01) |
| H04N 9/04 | (2006.01) |
| G06T 3/40 | (2006.01) |
| G06T 5/00 | (2006.01) |

(52) U.S. Cl.
CPC .. *H04N 9/04* (2013.01); *G06T 3/40* (2013.01); *G06T 5/003* (2013.01); *G06T 2200/21* (2013.01); *G06T 2207/10052* (2013.01); *G06T 2207/20221* (2013.01)

(58) Field of Classification Search
USPC ........ 348/222.1, 336, 345; 356/513, 515, 520
See application file for complete search history.

(56) References Cited

U.S. PATENT DOCUMENTS

| 6,084,227 | A  | * | 7/2000 | Rhoads ................... 250/201.9 |
| 6,240,219 | B1 | * | 5/2001 | Gregory ........................ 382/321 |
| 6,326,998 | B1 | * | 12/2001 | Palum .......................... 348/342 |
| 6,344,640 | B1 | * | 2/2002 | Rhoads ................... 250/201.9 |
| 8,169,620 | B1 | * | 5/2012 | Stahl et al. .................... 356/513 |
| 2006/0157640 | A1 |   | 7/2006 | Perlman et al. |
| 2007/0040828 | A1 |   | 2/2007 | Zalevsky et al. |
| 2009/0141163 | A1 | * | 6/2009 | Attar et al. ..................... 348/345 |
| 2012/0069237 | A1 | * | 3/2012 | Kishine ......................... 348/336 |

FOREIGN PATENT DOCUMENTS

| GB | 2367440 A | 4/2002 |
| WO | 03073153 A1 | 9/2003 |

OTHER PUBLICATIONS

Chen, Yuan et al., "Low Absorption Liquid Crystals for Mid-Wave Infrared Applications", Optics Express, vol. 19, No. 11, May 23, 2011.

(Continued)

*Primary Examiner* — Sinh Tran
*Assistant Examiner* — Xi Wang
(74) *Attorney, Agent, or Firm* — Lando & Anastasi, LLP

(57) ABSTRACT

Methods and apparatus for pixel multiplication in optical imaging systems. In one example, an expanded optical point spread function, referred to as a code spread function, is used to phase modulate an incident electromagnetic wavefront, and digital processing, including correlation techniques, are used to filter and process the modulated wavefront to recover sub-pixel information from an image produced by the wavefront on a pixilated detector array.

20 Claims, 36 Drawing Sheets

(56) References Cited

OTHER PUBLICATIONS

Veeraraghavan, Ashok et al., "Dappled Photography: Mask Enhanced Cameras for Heterodyned Light Fields and Coded Aperture Refocusing", ACM Transactions on Graphics, vol. 26, No. 3, Article 69, Jul. 2007.

Zalevsky, Zeev et al., "Light Efficient Imaging with Imaging with Improved Resolving Ability", Optics Communications, vol. 90, Apr. 1, 2001, pp. 69-77.

* cited by examiner

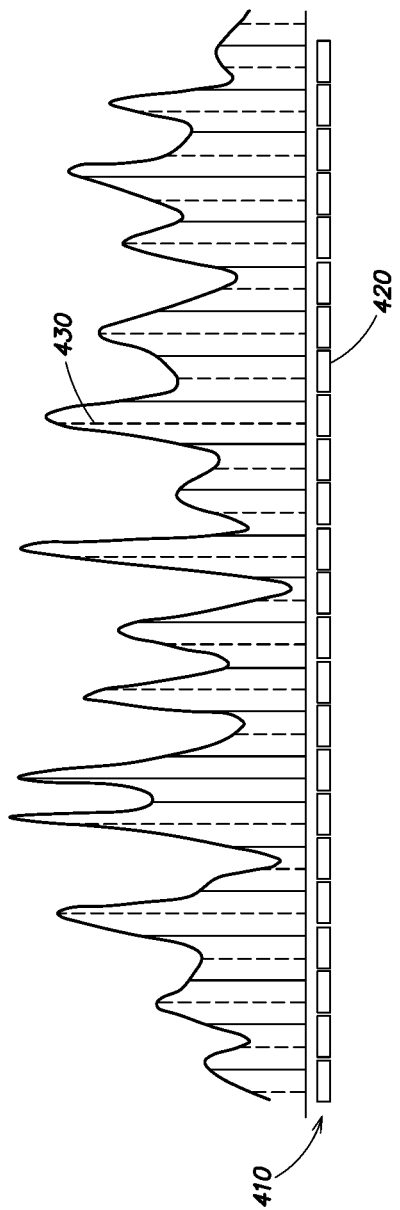

PIXEL MULTIPLICATION USING CODE SPREAD FUNCTIONS

BACKGROUND

There have been various techniques described and employed to increase the effective number of pixels delivered by a staring focal plane array sensor. Some techniques including dithering the image with respect to the focal plane, or using Hadamard masks in conjunction with the focal plane. These techniques, and others, effectively subdivide the detector so that it delivers an increased multiplicity of pixels. In most cases the subdivision provides a factor of four increase in pixel count by subdividing the detector into a two by two pixel array.

SUMMARY OF INVENTION

Aspects and embodiments are directed to a method of pixel multiplication (e.g., doubling, quadrupling or otherwise increasing the effective number of pixels) in a detector array that involves spatially modulating the wavefront in the lens pupil plane. According to one embodiment, the modulation causes the point spread function of the lens to be deliberately distorted and spread, becoming a complicated yet compact pattern, referred to as a code spread function, which is spread over many detectors. Sub-detector information may be recovered by correlation filtering, as discussed in more detail below.

According to one embodiment, a method of pixel multiplication in an optical imaging system comprises receiving a wavefront of electromagnetic radiation at an entrance aperture of the optical imaging system, propagating the wavefront to a pupil plane of the optical imaging system, modulating the wavefront at the pupil plane with a modulation pattern based on a predetermined code spread function for the optical imaging system to produce a modulated wavefront, propagating the modulated wavefront to an imaging detector which includes an array of detector pixels, each pixel having a pixel width, sampling the modulated wavefront at the imaging detector to produce a sampled data set, and digitally processing the sampled data set the produce an image. The digital processing includes replicating the sampled data set to produce at least two sampled data sets, individually filtering the at least two sampled data sets in parallel with corresponding digital correlation filters each having a filter function based on the predetermined code spread function to produce at least two filtered data sets, and interleaving the at least two filtered data sets to produce the image.

In one example propagating the wavefront to the pupil plane of the optical imaging system includes Fourier transforming the wavefront. In another example propagating the modulated wavefront to the imaging detector includes Fourier transforming the modulated wavefront. The digital processing of the sampled data set may further include Fourier transforming the sampled data set to produce a transformed data set, and replicating the sampled data ma include replicating the transformed data set. In one example replicating the transformed data set includes replicating the transformed data set three times to produce four sampled data sets, and each digital correlation filter corresponds to a shifted code spread function pattern corresponding to a half pixel width relative shift of the predetermined code spread function on the imaging detector. In another example filtering the at least two sampled data sets includes filtering the four sampled data sets by multiplying each sampled data set by a complex conjugate of the corresponding shifted code spread function pattern. In one example the predetermined code spread function has a non-zero average value, and the digital processing further includes band pass filtering the image to produce a filtered image. The digital processing may further include applying a recovery process to the filtered image to recover low spatial frequency information. In one example this recovery processing includes Fourier transforming the filtered image to produced a transformed image data set, passing the transformed image data set through a spatial frequency compensation filter to produce a filtered data set, and Fourier transforming the filtered data set to recreate the image.

The method may further comprise generating the predetermined code spread function by converting a point object having a predetermined intensity to an amplitude function, propagating the amplitude function to the pupil plane by Fourier transforming the amplitude function, in the Fourier domain, multiplying the amplitude function by the modulation pattern to produce a modulated function, propagating the modulated amplitude function to an image plane of the imaging detector by applying an inverse Fourier transform to produce a spatially constrained amplitude pattern, and converting the spatially constrained amplitude pattern to an intensity pattern though multiplication of the spatially constrained amplitude pattern with its complex conjugate to produce the code spread function. The method may further comprise partitioning the amplitude function in the image plane into two spatially distinct regions. In one example the method further comprises selectively activating an electro-optically active material to apply the modulation pattern to one of the two spatially distinct regions in the image plane.

According to another embodiment an imaging apparatus comprises an imaging detector array including a plurality of pixels, each having a pixel width, a lens configured to receive an electromagnetic wavefront from a distant scene, a modulation plate positioned at a pupil plane of the lens and configured to modulate the wavefront with a modulation pattern based on a predetermined code spread function for the lens to produce a modulated wavefront, the lens being further configured to focus the modulated wavefront onto a focal plane of the imaging detector array, and the imaging detector array configured to sample the modulated wavefront to produce a sampled data set, and a digital image processor coupled to the imaging detector array and configured to digitally process the sampled data set to produce an image of the scene, the digital processor configured to replicate the sampled data set to produce at least two sampled data sets, and including at least two digital correlation filters each having a filter function based on the predetermined code spread function and configured to filter a corresponding one of the at least two sampled data sets to produce at least two filtered data sets, wherein the digital image processor is further configured to interleave the at least two filtered data sets to produce the image of the scene.

In one example each digital correlation filter corresponds to a shifted code spread function pattern corresponding to a half pixel width relative shift of the predetermined code spread function on the imaging detector array. In another example wherein the predetermined code spread function has a non-zero average value, and the digital image processor further includes a band pass filter configured to filter the image to produce a filtered image. The modulation plate may be a phase modulation plate, for example. In one example the modulation plate is a switchable modulation plate including an electro-optically active material and a pair of optically transparent electrodes positioned on either side of the electro-optically active material. In another example the imaging apparatus further comprises a second switchable modulation plate stacked with the first switchable modulation plate, and a controller coupled to the first and second switchable modulation plates and configured to alternately switch on the first and second switchable modulation plates.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4A is a representation of one example of a super-sampled code spread function image according to aspects of the invention;

DETAILED DESCRIPTION

Figure 1:
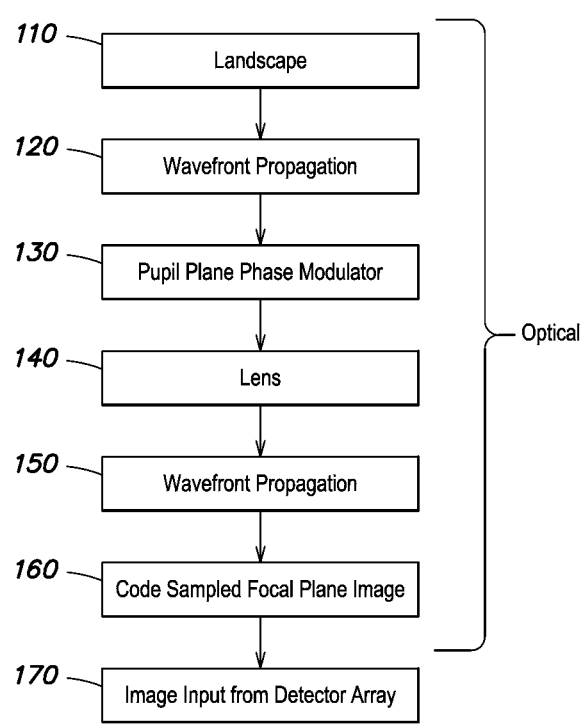
FIG. 1 is a flow diagram of one example of a method and apparatus for generating a code spread function according to aspects of the invention.

In optical imaging systems, a lens or other foreoptics focuses incoming electromagnetic radiation from a scene onto an imaging sensor. The following discussion may refer primarily to a lens as the foreoptics element; however, those skilled in the art, given the benefit of this disclosure, will appreciate that any of a wide variety of foreoptics may be used. The imaging sensor may include a focal plane array sensor or other pixelated array. Conventionally, each detector in the array corresponds to one pixel in an image of scene generated by the imaging sensor. Aspects and embodiments are directed to methods of pixel multiplication that deliberately corrupt the point spread function associated with the lens to effectively sub-divide the detectors in the array and create higher resolution (more pixels) images. Conventionally, the point spread function of the lens is matched to the detector array in some way. As discussed in more detail below, according to certain embodiments, the wavefront of the incoming electromagnetic radiation is spatially modulated in the lens pupil plane, thereby causing the point spread function of the lens to be deliberately distorted and information from the point spread function is distributed over many detectors in the array. This modified point spread function is referred to herein as a code spread function. Sub-detector information, or information below the resolution of the detector array, may be recovered by correlation filtering, as discussed further below.

According to certain embodiments, a computational optics device and associated method includes inserting a phase modulation plate into the pupil plane of the lens to spatially phase modulate the lens point spread function (PSF), thereby changing it into a much more broadly distributed patch of point source caused illumination, referred to as the code spread function (CSF). The intensity distribution within this patch may be such that it is sharply autocorrelated. Thus, an equivalent PSF may be synthesized through correlation processing. An advantage of this approach is that information contained within each detector is redistributed to many surrounding detectors. As a consequence, correlation techniques may be used to recover and resolve image information from regions much smaller than a detector. In some examples, multiple CSF sampled data sets are created by laboratory calibration whereby a collimated point source is laterally shifted by a fraction of a detector width. These data sets are converted into correlation filters. Subsequent interleaving of the images produces by these correlation filters generates an image with twice the resolution in the x and y directions. As discussed in more detail below, digital filtering techniques may be used to eliminate the DC pedestal that occurs with a non negative CSF. In other examples optical techniques, using switched modulation plates in the lens pupil plane, may provide a zero bias CSF, thereby eliminating the pedestal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

The principle of the code spread function discussed herein may be derived by analogy with source compensation holography. Holographic reconstruction may be modeled as a combination of correlation and convolution within the context of Fourier transforms. For example, consider source information, located in the diffraction far field of the hologram, encoded as an image wave with spatial pattern s(x). This pattern is defined as being in the source plane. Define a corresponding reference pattern to be r(x) also in the source plane. Both the spatial pattern and the reference pattern may be propagated to the far field (effectively the pupil plane) to create conjugate patterns S(w) and R(w), where S(w) is the Fourier transform of s(x) and R(w) is the Fourier transform of r(x). Adding the two transformed (wavefront) patterns together to create an interference pattern, and recording the resulting intensity pattern in a recording medium, such as photographic film, produces:

$$H(w)=[S(w)+R(w)][S^*(w)+R^*(w)]=H(w)=|S(w)|^2+|R(w)|^2+S(w)R^*(w)+R(w)S^*(w) \quad (1)$$

The term of interest in Equation (1) is:

$$H=S(w)R^*(w) \quad (2)$$

During reconstruction of the hologram, the reference pattern r(x) is again propagated through the optical system, and transformed to become the reference wave R(w). This reference wave is modulated by the hologram term H given in Equation (2). The result is:

$$R(w)H=R(w)[S(w)R^*(w)]=S(w)|R(w)|^2 \quad (3)$$

In conventional forms of holography the reference wave is a section of a spherical wave (a plane wave in the limit case). In this case $|R(w)|^2$ is constant and S(w) is reconstructed. S(w) may then be propagated to the far field to become the reconstructed source pattern s(x). If $|R(w)|^2$ is not constant, but r(x) has the property of having a very short autocorrelation length, then a good reconstruction of s(x) can still be obtained. This process is referred to as called source compensation holography.

Referring to Equation (3), if a Fourier transform is taken of the middle or right hand term, the result is s(x) convolved with the autocorrelation of r(x). In the source compensation circumstance where the autocorrelation of r(x) is point-like, this autocorrelation resembles a conventional optical point spread function, and mathematically is approximated by a Dirac delta function. Convolving the delta-like function with s(x) allows for recovery of the function s(x).

Source compensation generally involves inserting a spatially correlated phase modulation plate into a conventional planar or spherical reference wave. The modulation plate may be a sheet of ground glass, or a piece of shower glass, for example. In most cases the Fourier transform of the spatially modulated reference wave produces an autocorrelation function in the source plane which resembles a Dirac delta function, and therefore will give a good quality reconstruction of the source pattern. Those skilled in the art will appreciate, given the benefit of this disclosure, that in order for a good reconstruction of the source wave to occur, the spatial modulation pattern must be duplicated exactly. Shifting the position of the reference modulator, R(w), creates an entirely new pattern in the source plane and also a completely different holographic interference pattern. Thus, good reconstruction of a particular image may occur only when the reference modulator is positioned well within its own spatial autocorrelation length. Furthermore, although the central point of the autocorrelated far field pattern may be delta function point-like, the sidelobes may be very different. For example, if the modulation is a random phase pattern, the sidelobes of the far field pattern will be a field of random intensities.

Referring to FIG. 1, there is illustrated a flow diagram corresponding to one example of a method and apparatus for generating a code spread function in accord with one embodiment. In generating a code spread function (CSF) electromagnetic radiation from a landscape source plane is propagated through a lens, and spatially modulated at the lens pupil plane. The modulated electromagnetic radiation then proceeds to illuminate the focal plane. This general flow of electromagnetic radiation, from the source to the focal plane, is illustrated by FIG. 1. Electromagnetic radiation is transmitted or reflected by an illuminated landscape 110, and the wave of electromagnetic radiation propagates (120) to the pupil plane of the lens 140. During this propagation 120 the electromagnetic radiation undergoes diffraction. If the lens 140 is sufficiently distant from the observed landscape 110, the diffraction will be Fraunhofer. A Fraunhofer diffracted wavefront undergoes a Fourier transformation. Thus, Fourier transformations are appropriate for modeling such an optical imaging system.

According to one embodiment, when the wavefront reaches the lens pupil plane it is spatially modulated by a phase plate 130. In one example, the phase modulator 130 is spatially varying in such a way that it changes the relative phases of each separate portion of the wavefront. The specific spatial modulation pattern is determined by the desired form of the desired code spread function, as discussed further below. In some embodiments a phase modulating plate is preferred because phase modulation does not attenuate the electromagnetic wave. However, in other embodiments modulation plates which are partially absorbing may be used. In certain examples, the spatial modulation of the wavefront by the phase modulator 130 may be considered analogous to phase plate modulation of the reference wave in source compensation holography because the pupil plane is the Fourier transform conjugate of the image plane (where the detector array is located).

After passing through the phase modulator 130, the wavefront is focused by the lens 140 such that during propagation 150 it is further Fraunhofer diffracted until it arrives at the focal plane. According to one example, the image 160 produced at the focal plane is modified by the phase modulation plate 130 in such a way that the true image is convolved with the code spread function induced by the phase modulation plate. In one example, the result of the pupil plane spatial phase modulation is that the image of a point source of electromagnetic radiation is spread out into a complicated pattern which covers a moderately large group of detectors in the detector array. The code spread function may be defined as this extended area of illumination from a single point source of electromagnetic radiation in the far field. Moving the point source of electromagnetic radiation will cause the code spread function to correspondingly shift its position.

Conventionally, an image is the result of the convolution of the lens point spread function with the array of light sources. According to certain embodiments, an image produced by an optical system in which the lens produces a code spread function instead of a point-like point spread function is the result of convolution of the code spread function with the source of electromagnetic radiation. However, the convolution of the source with the code spread function "scrambles" the image information. Accordingly, correlation techniques may be used to "unscramble" this information and produce the true image, as discussed further below. The convolved image is converted by the detectors in the focal plane detector array into a sampled data set 170. This data set may be treated as a vector or a matrix for further digital processing.

According to one embodiment, an advantage of generating a spread out code spread function is that information contained within the confines of a given detector (i.e., sub-detector information) may be retrieved. This result may be achieved because the code spread function deposits portions of this interior information on the surrounding detectors. Thus, the code spread function may allow the artificial creation of an array of pixels which is more dense than the physical array of detectors. In one embodiment, digital processing of the sampled data set 170 is used to extract an image which is higher resolution than the detector array, without the intervention of the code spread function, would be able to deliver. Thus, effectively, embodiments of the optical system may be configured to produce an image in which multiple pixels are obtained from each detector in the imaging sensor array.

Figure 2:
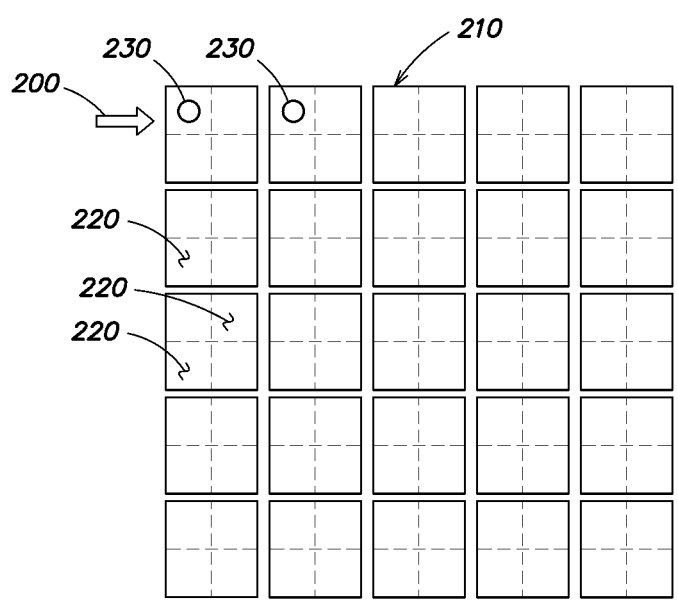
FIG. 2 is a conceptual diagram of one example of a two dimensional array of detectors according to aspects of the invention.

FIG. 2 illustrates, conceptually, a two-dimensional array 200 of detectors 210 in which each detector is sub-divided into four pixels 220. The pixels 220 form a super-sampled array. In the example illustrated in FIG. 2, the conceptual array 200 includes 25 detectors arranged in a 5×5 grid. Since each detector 210 is divided into four pixels 220, the total pixel count is 100 arranged in a 10×10 array. This scheme may be expanded to any desired array size, and the array 200 need not be square. According to one embodiment, it is assumed that the normal point spread function of the lens (without the pupil plane phase modulation) is significantly smaller than the detector 210. This is illustrated by circles 230 representing points of electromagnetic radiation illuminating adjacent detectors.

Figure 3A:
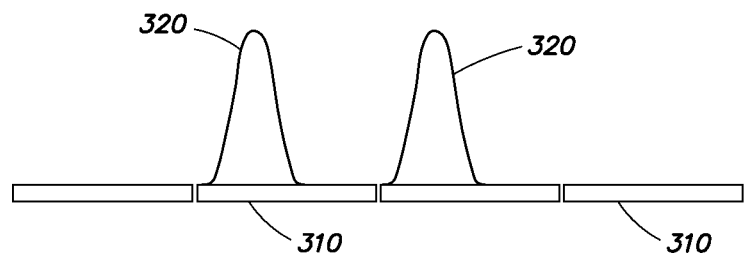
FIG. 3A is a representation of adjacent pixels of a detector illuminated by point light sources.
Figure 3B:
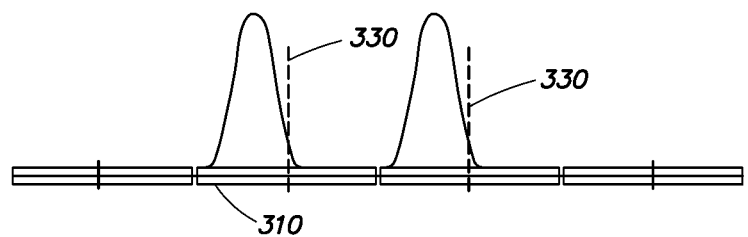
FIG. 3B is a representation of a pair of adjacent data samples obtained from the illumination by light sources of FIG. 3A.
Figure 3C:
FIG. 3C is a representation of an output from the detector resulting from processing of the data samples of FIG. 3B.

Referring FIG. 3A illustrates two adjacent detectors 310 illuminated by two separate points of light 320. The result is a pair of adjacent data samples 330, as illustrated in FIG. 3B. In a conventional system, with a narrow point spread function, these two points will be unresolved. The point illuminations may fall anywhere within the boundary of a detector and still produce the same output from the detector. Although adjacent detectors are illuminated, the data samples 330 from these light points 320 will be fused together to make a single, somewhat elongated, unresolved object 340, as illustrated in FIG. 3C.

Figure 3D:
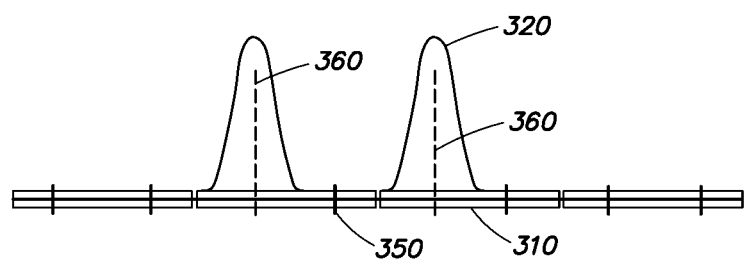
FIG. 3D is a representation of the adjacent illuminations of FIG. 3A separated by an artificially created intervening sample, according to aspects of the invention.

In contrast, using a code spread function according to aspects and embodiments of the present invention may double (or otherwise increase) the sampling density through pixel multiplication, such that the point illuminations 320 are resolved by the placement of an artificially created intervening sample 350, as illustrated in FIG. 3D. The resolved output is two samples 360 with a gap sample in between. Thus, the two objects (point illuminations 320 in the illustrated example) can be distinguished or resolved from each other and the separation between them may be detected in a measurable way.

Figure 4B:
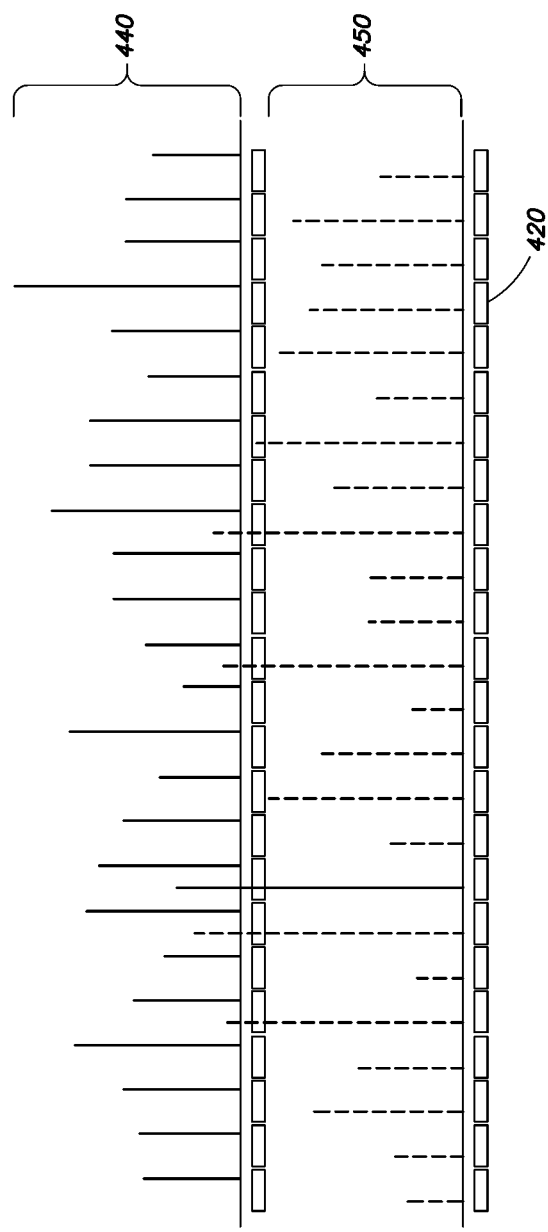
FIG. 4B is a representation of first and second sub-sample sets taken from the super-sampled code spread function image of FIG. 4A according to aspects of the invention.

According to one embodiment, to resolve the two data points 360 as illustrated in FIG. 3D, a mechanism is used which provides a distinguishable measure for each of the two points. As will be appreciated by those skilled in the art, given the benefit of this disclosure, this principle may be extended for multiple resolved data points. In one embodiment, the mechanism for resolving the data points includes generating multiple code spread functions which change shape, and partially decorrelate, depending on their relative sampling position with respect to the detector array. For example, for a two dimensional detector array there are four such code spread functions used. For the following one dimensional illustrative example, there are two such code spread functions used. The one dimensional example is discussed below with reference to FIGS. 4A and 4B. In this example, the detector array 410 includes a linear array of detectors 420. In each of FIGS. 4A and 4B, each vertical stroke 430 represents a sample. Alternate samples are represented by dotted lines. In this example, the samples are divided into two subsets, referred to as the right subsample set 440 and the left subsample set 450, as illustrated in FIG. 4B. These two subsets 440, 450 of samples contribute to separate code spread functions which may be used to generate different correlation masks, as discussed further below.

FIG. 4A represents a super-sampled code spread function image. In FIG. 4A, the spacing between the vertical strokes 430, or super-sample distance, corresponds to the width of an unmodified point spread function. Two adjacent vertical strokes correspond to the width of a detector 420. As discussed above, according to certain examples, the unmodified point spread function is substantially narrower than the width of a detector. When alternate supersamples are extracted, the result is two patterns (arrays of subsamples 440, 450), as illustrated in FIG. 4B. These two patterns may be somewhat similar but are not identical, and may be substantially different.

If the super-sample array (FIG. 4A) is a completely random pattern, its correlation length will be established by the width of the unmodified lens point spread function. If this pattern is projected onto a detector array which matches in spacing the normal lens point spread function, the two patterns 440, 450 of FIG. 4B would be completely uncorrelated (except for a D.C. offset term). However, for examples in which the detectors are larger than the normal lens point spread function (for example, twice the size as in the illustrated example), the two subsample patterns will be partially correlated. As discussed further below, for this example, the correlation between the left and the right subsample patterns is about 50% (provided that the D.C. offset term is first subtracted). A 50% correlation dip between adjacent point images easily meets the traditional criterion for resolving point targets. According to certain embodiments, methods and apparatus provide for the generation of an optical code spread function which is reasonably compact and which becomes fully decorrelated when it is displaced by half the width of a detector. Such an optical pattern makes it possible to distinguish point illuminations on adjacent detectors with a substantial signal dip between them, as discussed further below.

The following discussion of various embodiments may refer primarily to the use of random patterns for the code spread function. Random pattern code spread functions may be advantageous in that the auto-correlation may produce a single sharp peak with relatively low sidelobes. Periodicity in the code spread function pattern may produce multiple peaks in the auto-correlation function. However, embodiments are not constrained to random patterns, and any pattern having a suitably narrow autocorrelation may be used. For example, Hadamard functions may be used in some embodiments. The pattern, whether random or not, is generated by an appropriate spatial modulator located in the pupil plane of the lens or other foreoptics. In some embodiments, a phase-only modulator is preferred; however, other embodiments may use modulators which partially absorb the passing light, although there will be light loss with such modulators.

Many code spread functions include a D.C. (constant) offset, which may introduce a significant disturbance in the image measurement process. Accordingly, techniques to address this "pedestal" problem as discussed further below. However, for the purposes of illustration, the following examples will assume a code spread function with a zero mean.

Figure 5:
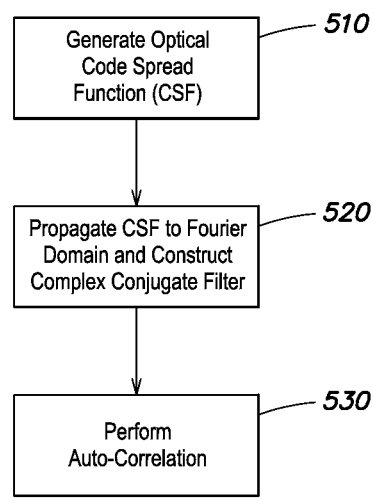
FIG. 5 is a flow diagram of one example of an imaging processing method according to aspects of the invention.

One embodiment is directed to a process of resolving two points of illumination which are spaced a detector width apart. A flow diagram corresponding to one example of this process is illustrated in FIG. 5. The following examples involve one dimensional experiments; however, those skilled in the art will appreciate, given the benefit of this disclosure, that the process may be readily generalized to two dimensions.

Figure 6A:
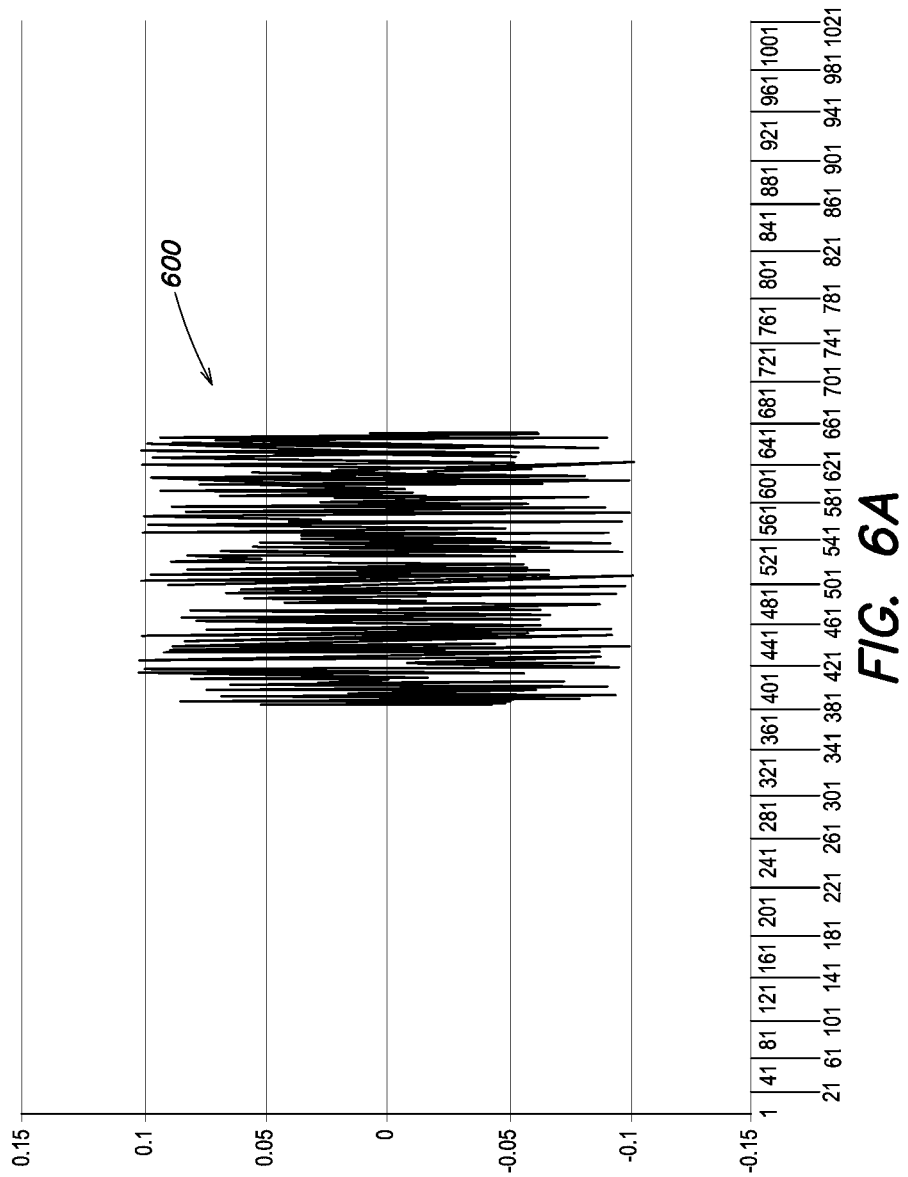
FIG. 6A is a representation of one example of a super-sampled code spread function according to aspects of the invention.

In a first step 510, an optical code spread function is generated. Referring to FIG. 6A, there is illustrated one example of a super-sampled, zero mean code spread function produced by a random process. This code spread function 600 is non-physical in most circumstances because a detector cannot measure negative light (except where a local oscillator wave is present to provide a phase reference). In one embodiment, as illustrated in FIG. 6, the code spread function 600 is confined to a limited portion of the detector area or focal plane. According to one embodiment, a guard border is established at the edge of the focal plane, the guard border being half the width of the code spread function, thus resulting in the confinement of the code spread function. In this border region the resolution of the image may be corrupted by the correlation process, and may therefore be discarded. Thus, there is a trade between the size of the code spread function and the area of the image that can be recovered. Increasing the size of the code spread function increases the signal to sidelobe ratio, but also decreases the useful area of the image.

Figure 6B:
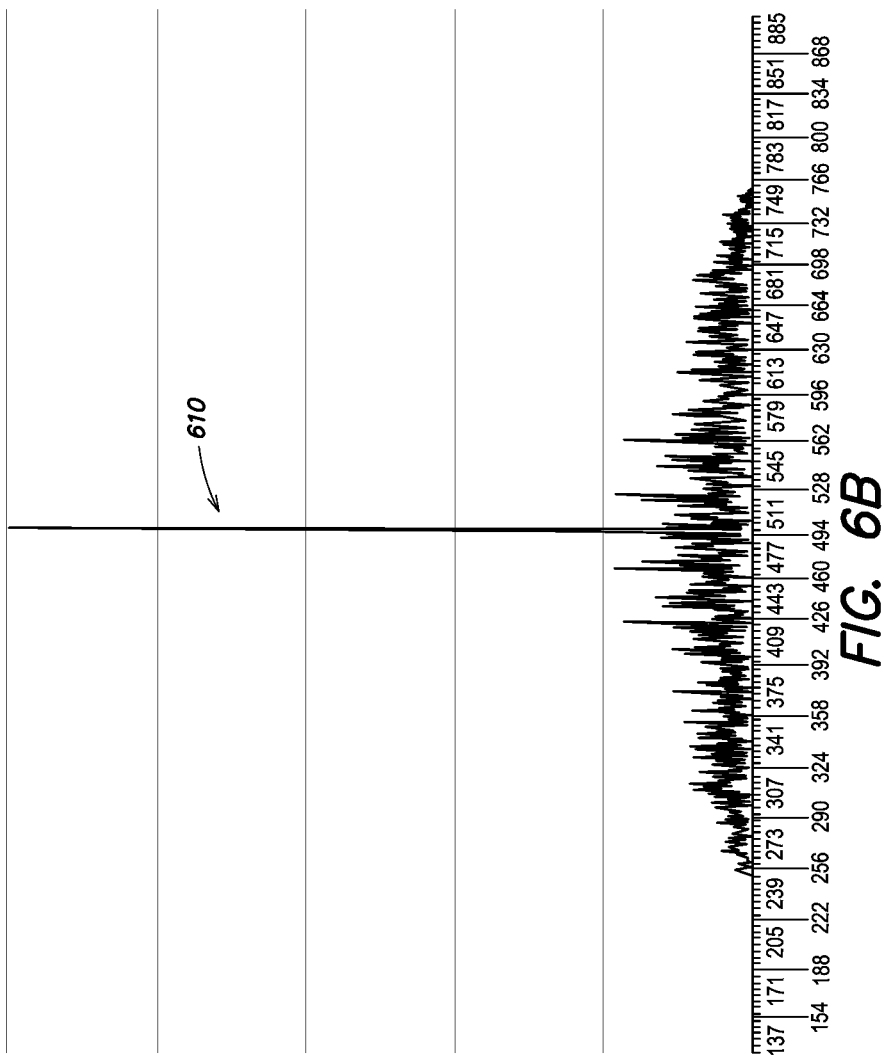
FIG. 6B is a representation of the autocorrelation of the code spread function of FIG. 6A.

In step 520, the code spread function is propagated to the Fourier domain and a complex conjugate correlation filter is constructed from it. In one example, the filter has the property of being a phase-only filter. As a result, the filter modifies the phases of different samples of the passing signal, but does not change the amplitude. In step 530 the autocorrelation of the code spread function is obtained. The autocorrelation of the code spread function 600 is illustrated in FIG. 6B. The autocorrelation of the code spread function 600 has a sharply defined, and very narrow, peak 610 and a surround of random sidelobes. The autocorrelation is produced by propagating the code spread function 600 to the pupil domain through a Fourier transform. The resulting data set is multiplied with the correlation filter and the product is inverse Fourier transformed back to the image domain. FIG. 6B illustrates the result of this process for a single point object. The same process may be performed with an extended image data set. During this digital processing of the image, the sharp peak serves essentially the same purpose as the narrow and peaked point spread function of a conventional lens. Thus, in one example, this peak 610 convolves with the true imagery to produce the real measured imagery.

According to one embodiment, the sidelobe structures produced by autocorrelation of the code spread function are different from those of a conventional PSF. In one example, with a random code spread function the peak to sidelobe ratio is approximately the square root of the number of samples contributing to the code spread function (i.e., the width of the code spread function). Thus, by increasing the size of the code spread function, the peak to sidelobe ratio will also be increased, though not in proportion. As will be appreciated by those skilled in the art, given the benefit of this disclosure, in the case of two dimensional images, the code spread function is also two dimensional. In the two dimensional case the peak to side lobe ratio is linearly proportional to the width of the code spread function. Thus, for example, a 64 by 64 code spread function will have a peak to side lobe ratio of 64:1. This provides an image quality which favorably compares with that produced by a diffraction limited lens with a circular clear aperture.

Figure 7A:
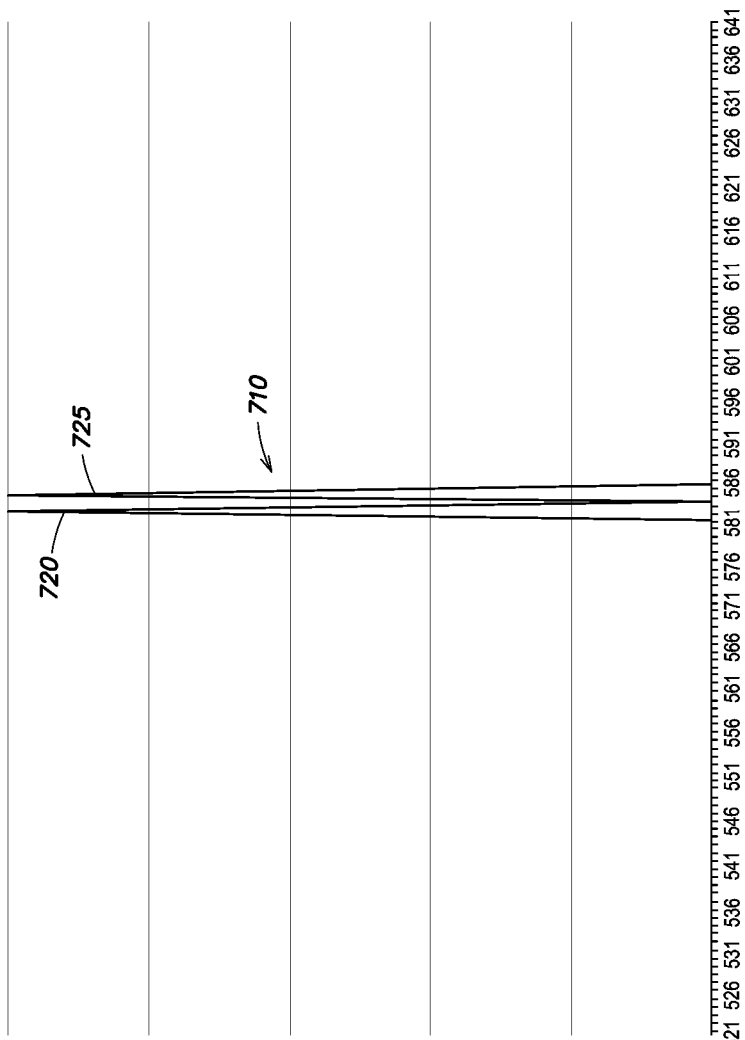
FIG. 7A is a representation of one example of a data vector which is the equivalent of a pair of illumination points, according to aspects of the invention.
Figure 7B:
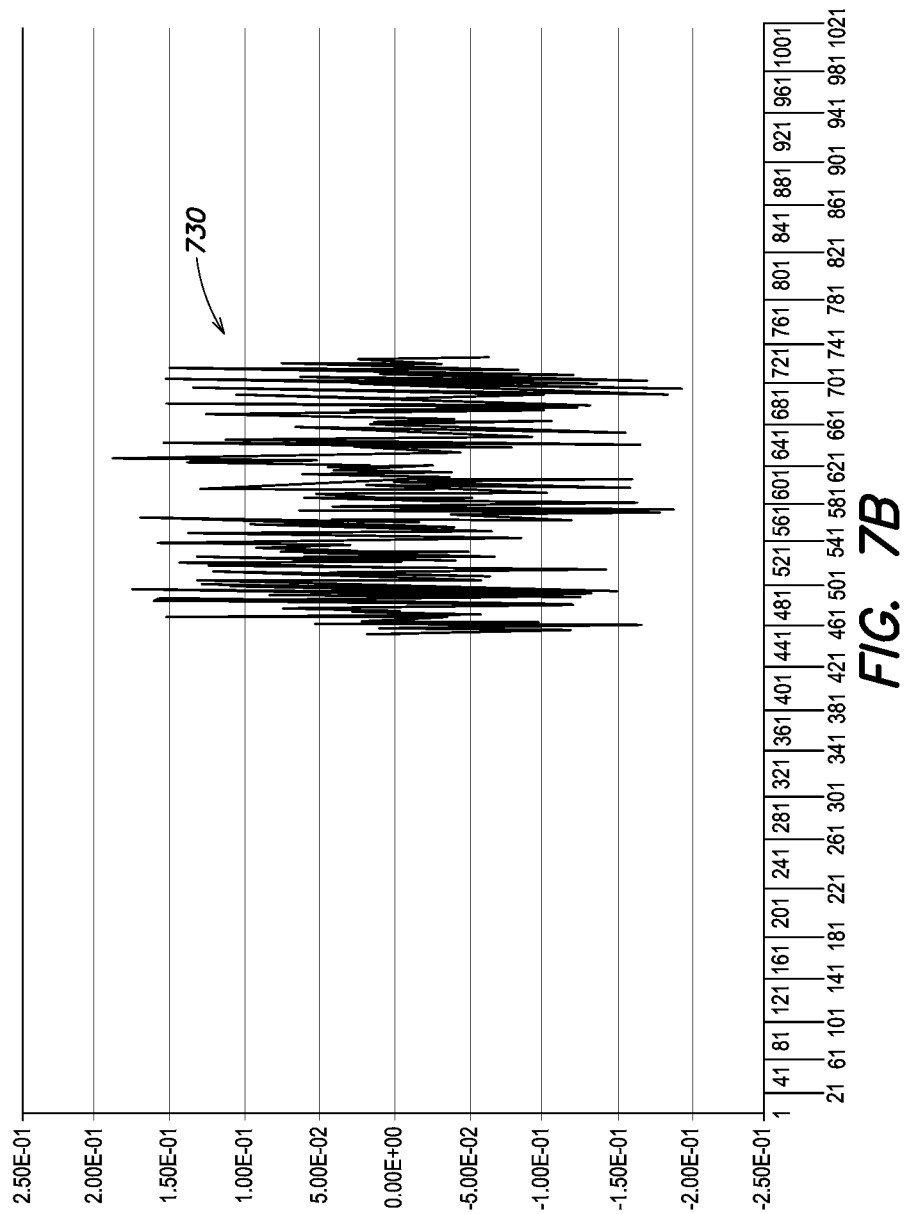
FIG. 7B is a representation of an image produced by the convolution of the code spread function of FIG. 6A with the data vector of FIG. 7A, according to aspects of the invention.

In one example, the above-discussed approach may be used to spatially resolve two points of light which fall on adjacent detectors, as illustrated in FIG. 2, for example. FIG. 7A illustrates an example of a data vector 710 which is the equivalent of a pair of illumination points. The data vector has two non-zero points 720, 725 which are two supersamples apart. Referring again to FIG. 1, in this example Fraunhofer diffraction propagation 120, of far field light sources to the pupil plane of the lens 140, is emulated by a Fast Fourier Transform (FFT) of the input data vector 710. In other words, the input two point data vector 710 is Fourier transformed to reach an equivalent of the lens pupil plane. At this Fourier transformed location the data vector 710 is multiplied by a phase modulation pattern (130). In one example, the phase modulation pattern is derived from the Fourier transform of the desired code spread function, such as that illustrated in FIG. 6A, for example. The further propagation from the lens to the focal plane (150) is emulated by an inverse FFT. In this example, taking the inverse Fourier transform of the modulated data vector results in an image produced by the convolution of the code spread function 600 with the data vector 710. This image 730 is shown FIG. 7B. The resulting image 730 may be "unscrambled" to recover and resolve the two sample points 720, 725 of the original data vector 710 illustrated in FIG. 7A.

Figure 7C:
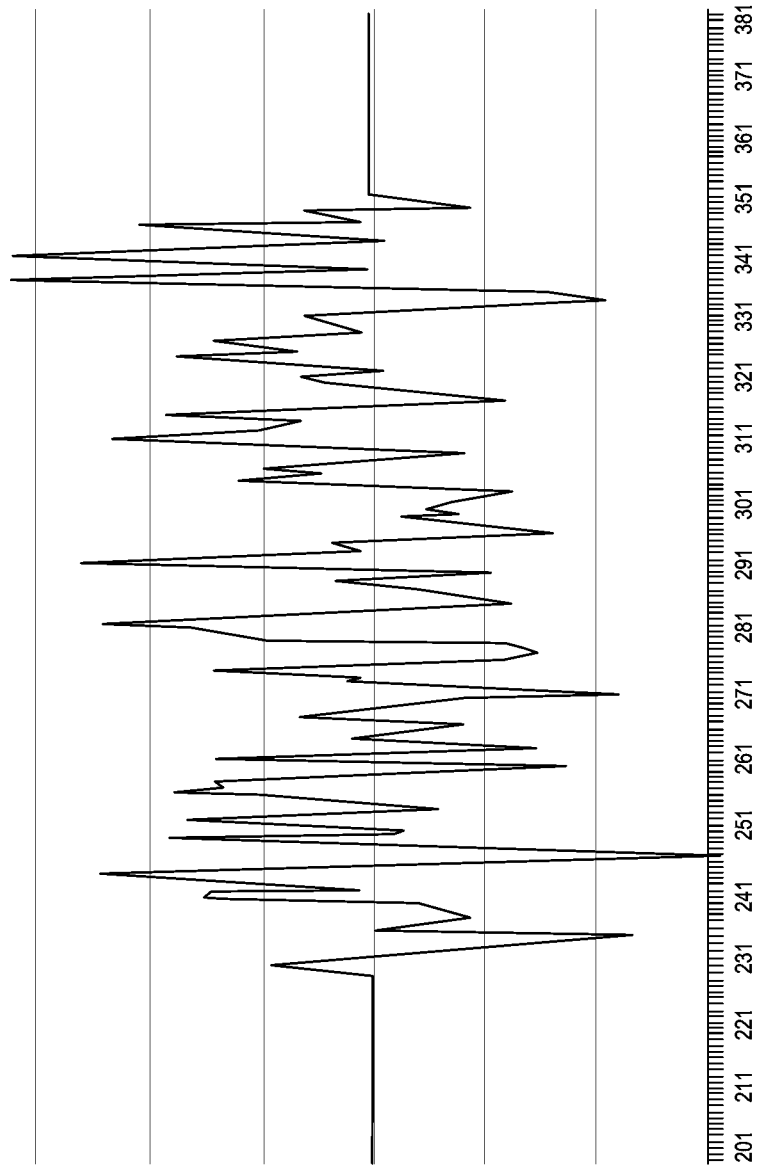
FIG. 7C is a representation of a filtered pattern produced from the image of FIG. 7B using conventional auto-correlation techniques.
Figure 7D:
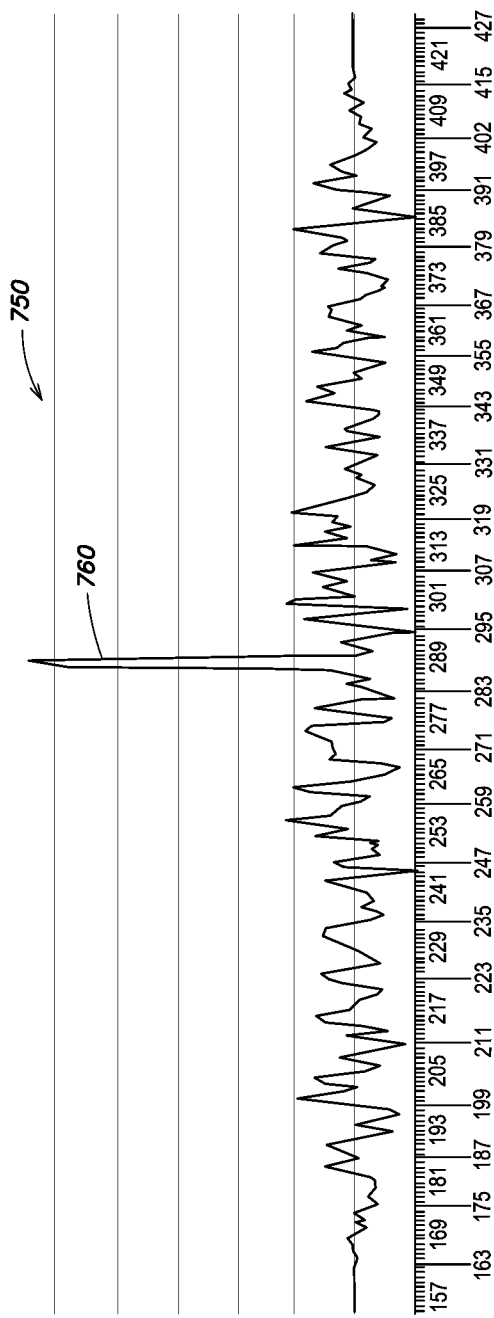
FIG. 7D is a representation of the autocorrelation of the filtered pattern of FIG. 7C.

Using only conventional auto-correlation techniques, the individual detectors 210 are too large to properly resolve the structure of the data vector 710. In effect, the detectors 210 act to low-pass filter the data vector 710, and convert the image 730 of FIG. 7B into a filtered pattern 740 as shown in FIG. 7C. This pattern is what the detector array "sees" and adjacent image points are combined. Autocorrelation of the filtered pattern 740 produces a pattern 750 in which the two points 720, 725 are unresolved and appear as a single peak 760, as shown in FIG. 7D.

Figure 8A:
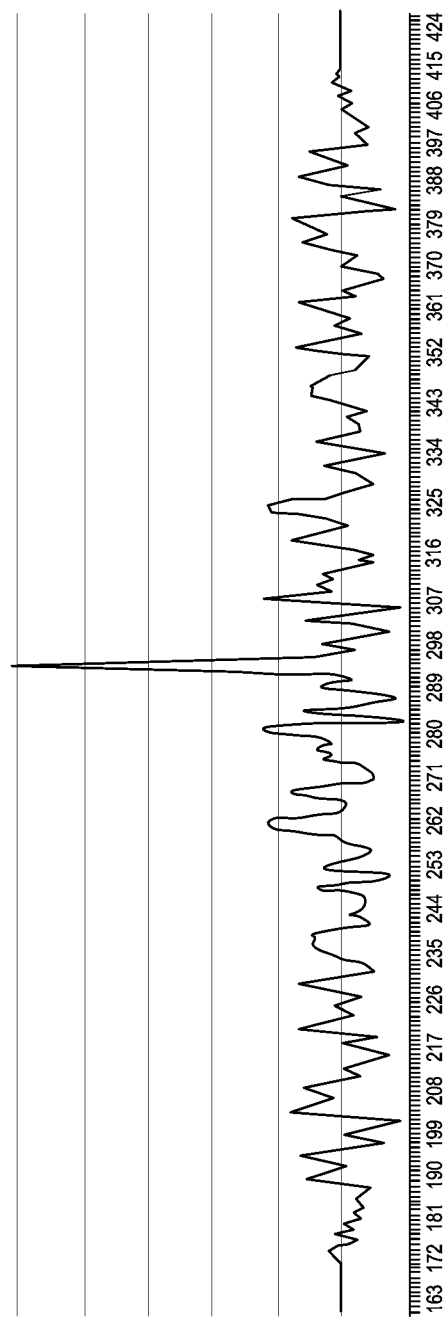
FIG. 8A is a representation of a first correlation sample set from the code spread function of FIG. 6A according to aspects of the invention.
Figure 8B:
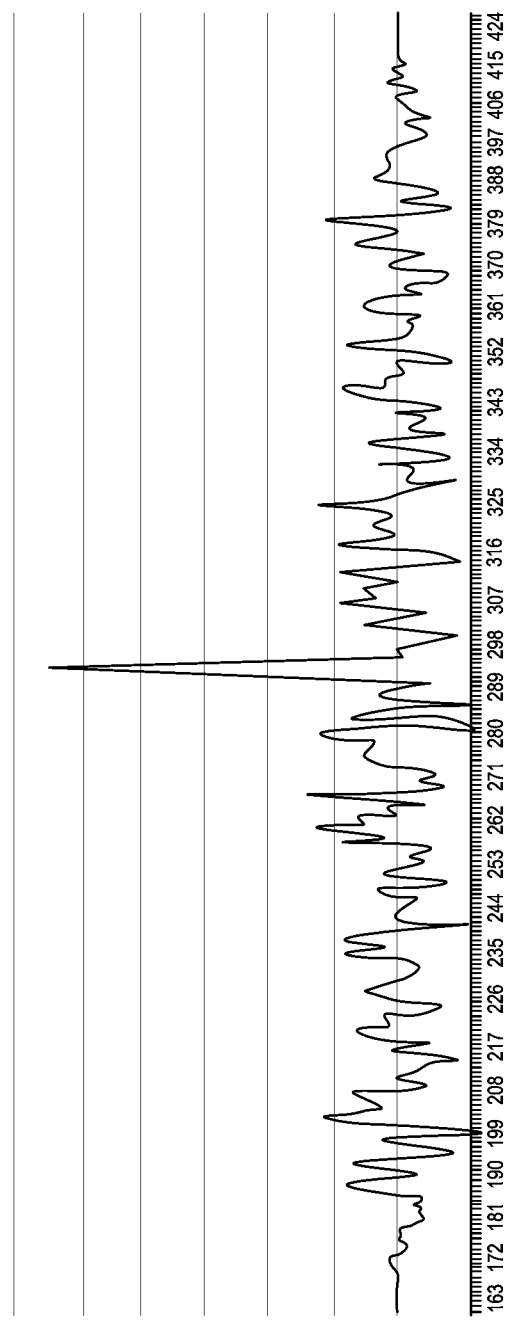
FIG. 8B is a representation of a second correlation sample set from the code spread function of FIG. 6A according to aspects of the invention.
Figure 9A:
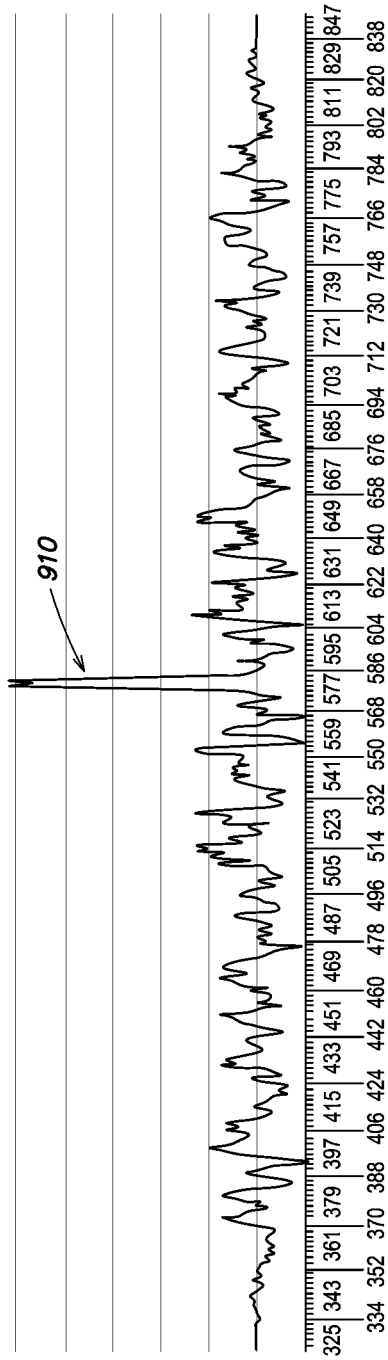
FIG. 9A is a representation of a signal produced by interlacing the first and second correlation sample sets of FIGS. 8A and 8B with half a detector width displacement between them, according to aspects of the invention.
Figure 9B:
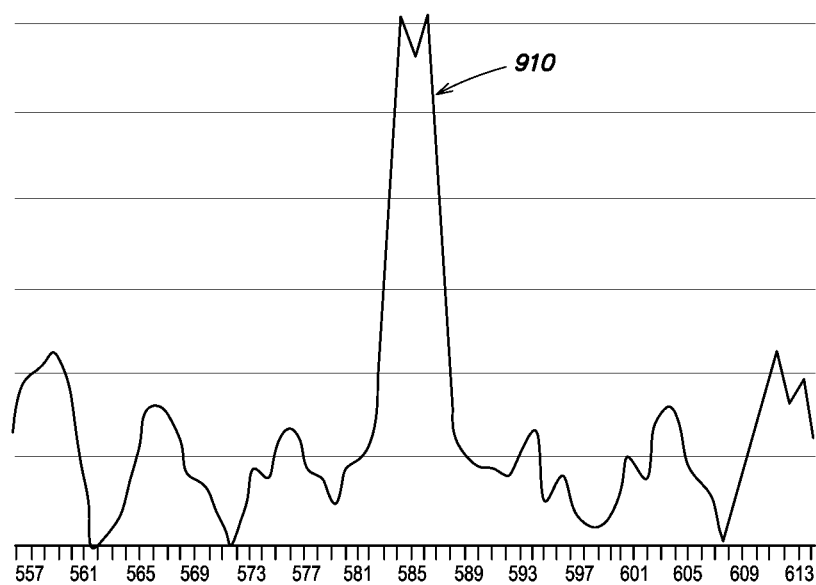
FIG. 9B is a magnified view of a portion of the signal of FIG. 9A.

In contrast, aspects and embodiments employ the code spread function to resolve the image points 720, 725 and obtain a higher resolution final image. According to one embodiment, the full resolution code spread function is partitioned into two sample data sets, namely a first data set and a second data set. The second data set corresponds to an image shift of half a pixel with respect to the first data set. This partitioning scheme creates two new code spread functions, one for each position of the image, as illustrated in FIGS. 4A and 4B. Each of these two partitioned code spread functions may then be separately correlated with the image delivered by the physical detectors. This correlation produces two sub images, referred to as a left correlation sample set and a right correlation sample set, each corresponding to a slightly different displacement with respect to the detector sampling grid. Examples of the left and right correlation sample sets are illustrated in FIGS. 8A and 8B, respectively. Interlacing the left and right correlation sample sets, with half a detector width displacement between them, produces a new sample set with twice the number of samples and twice the effective resolution. FIG. 9A illustrates an example of the interlaced result (corresponding to FIGS. 8A and 8B), with the desired improvement in spatial resolution. FIG. 9B illustrates a magnified view of the now resolved double peak 910.

Figure 10A:
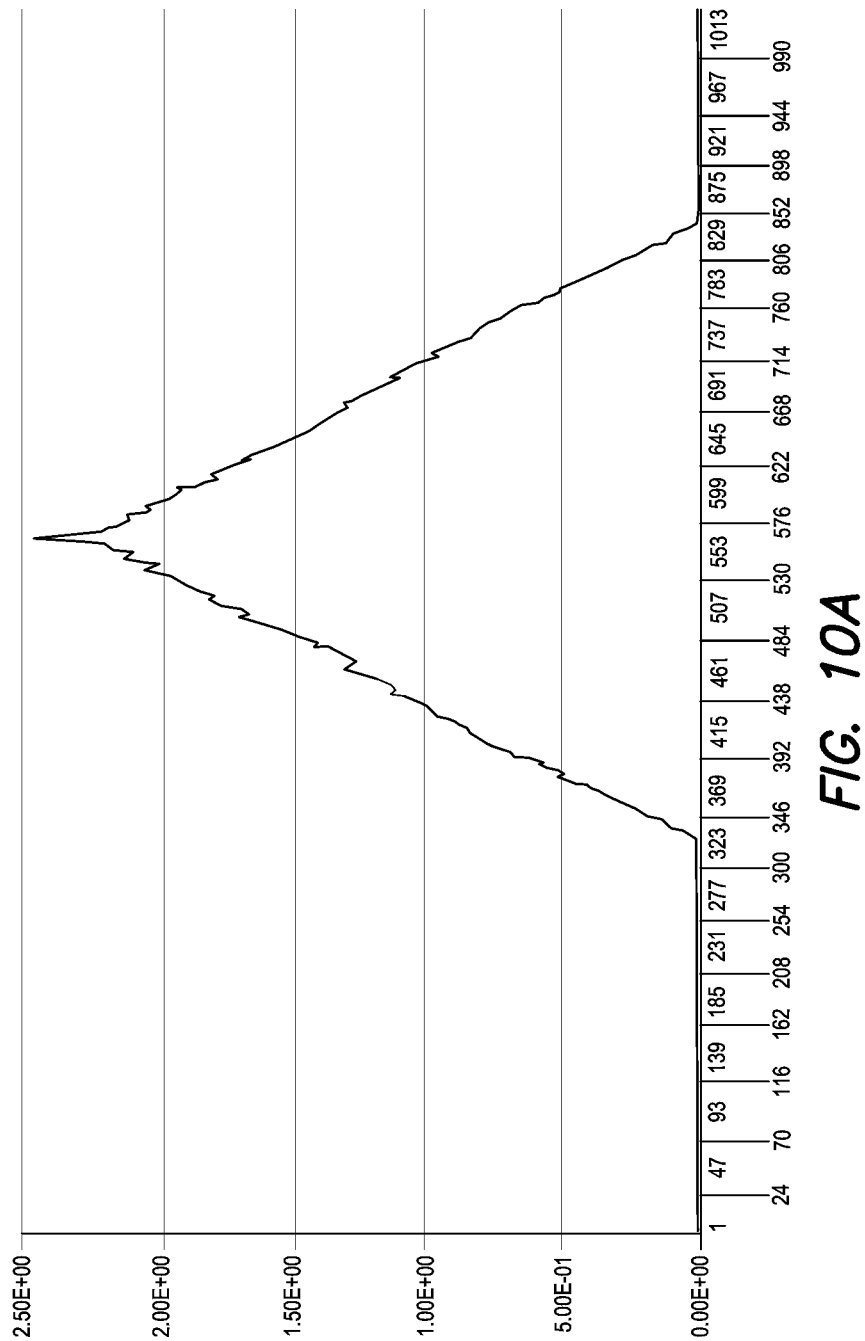
FIG. 10A is a representation of the auto-correlation of the code spread function of FIG. 6A for the one dimensional case with two closely spaced point sources.
Figure 10B:
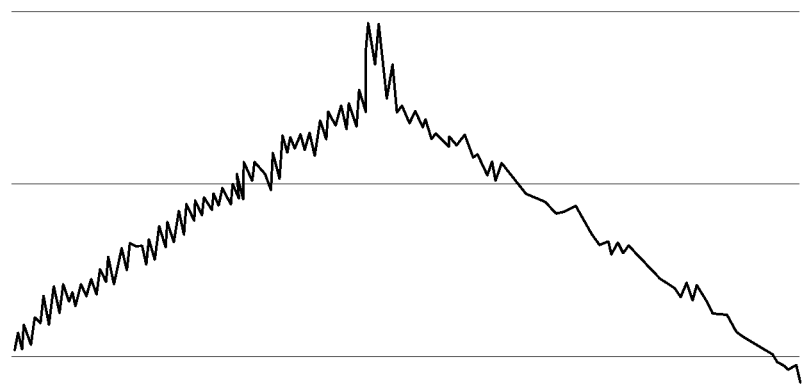
FIG. 10B is an enlarged view of a portion of the signal of FIG. 10A.

The example super-sampled code spread function 600 illustrated in FIG. 6A includes both positive and negative values. However, in practice, the detectors 210 of detector array 200 record incident energy in a light wave, and this energy is never negative. As a result, in the majority of optical imaging systems, the pattern projected onto the focal plane of the detectors will be positive definite (except in the case of coherent optical systems which directly detect the amplitude distribution of the wavefront). Accordingly, the code spread function will have a positive D.C. bias, as discussed above, which leads to the "pedestal problem." If the code spread function is a uniformly distributed random function this bias term will be an additive constant within the extent of the code spread function. Such a constant signal with a finite extent is often called a "box" function. Referring to FIGS. 10A and 10B, for a code spread function with a D.C. bias, during the correlation process discussed above, two correlations take place simultaneously and linearly. The first is the autocorrelation of a random-like function which has a zero average value. The second autocorrelation is that of the D.C. bias term. This second autocorrelation produces a triangular function for one dimensional box functions and a pyramidal function for a two dimensional box function. FIGS. 10A and 10B illustrate an example of the one dimensional case with two closely spaced point sources. As is apparent from FIGS. 10A and 10B, the pedestal dominates the correlation recovery process. A similar situation exists for the two dimensional case.

According to certain embodiments, techniques are implemented to address this "pedestal problem," as discussed below. It will further be appreciated by those skilled in the art, given the benefit of this disclosure, that certain optical systems may be implemented which effectively synthesize a zero average code spread function. For example, such a system may use switchable phase modulation plates in the lens pupil plane, as discussed further below.

The Fourier transform of a box function is a sin(x)/x, or sinc, function. As discussed below, the majority of the energy in this function is at low spatial frequencies, with the peak value, at zero spatial frequency, being the integral of the D.C. offset of the box function. However, a sinc function has oscillating sidelobes which extend, at low amplitude, to high spatial frequencies. These high spatial frequency sidelobes are the result of the sharp corners of the box function. By smoothing these edges of the box the high spatial frequencies of this function may be suppressed. In one example, this may be accomplished by smoothly reducing the values of the code spread function values at its edges.

Figure 11:
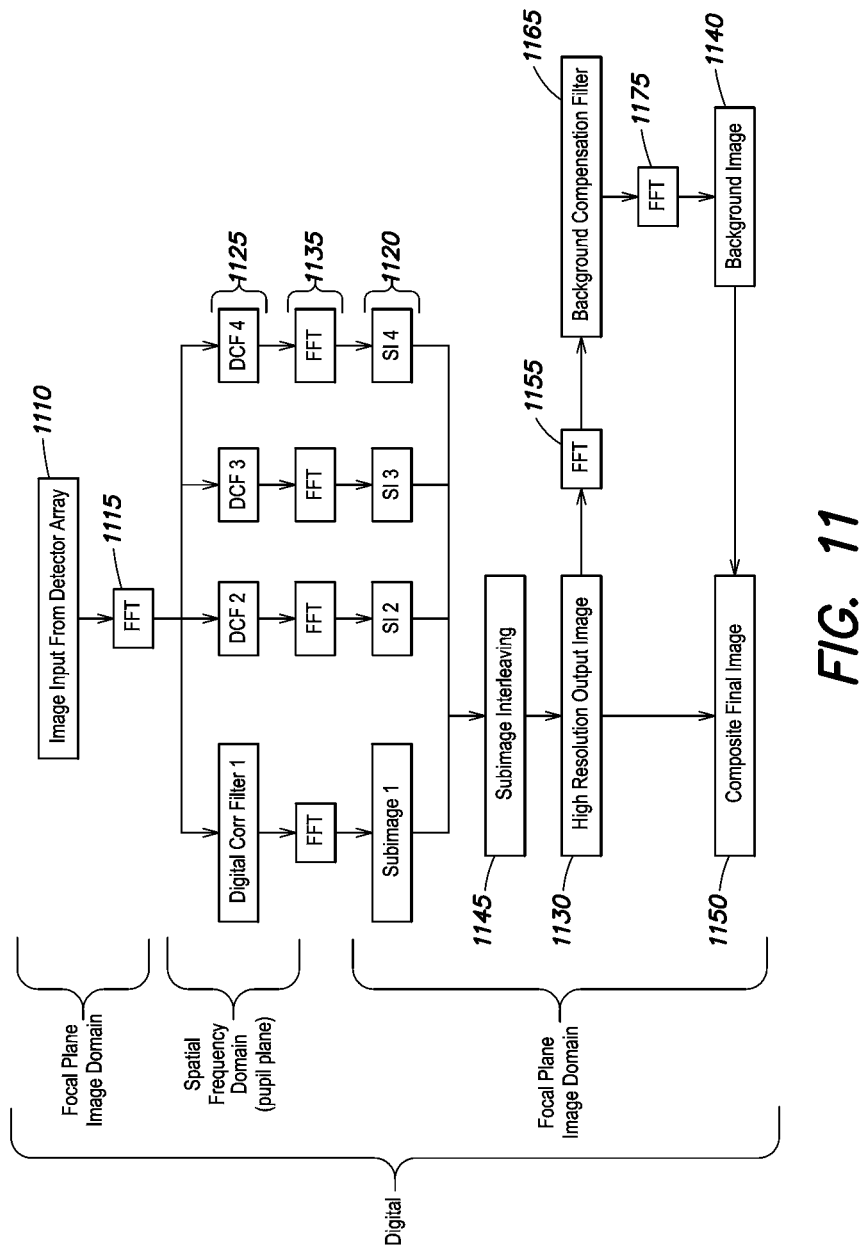
FIG. 11 is a flow diagram of one example of a digital processing scheme for recovering an image from a convolved data set using a code spread function according to aspects of the invention.

According to one embodiment, digital linear filtering in the Fourier domain is used to reduce, or preferably eliminate, the effects of the pedestal and recover a high quality image from the convolved data set. There are several different filtering techniques which may be implemented, as discussed further below. A flow diagram of a general approach for digital processing of the convolved data set is illustrated in FIG. 11. According to one embodiment, examples of this processing technique is linear and involve only a single pass, in substantial contrast to most conventional computational imaging techniques which require substantial iteration, and therefore computation, to recover a high quality image. In certain aspects the digital processing of FIG. 11 emulates the optical flow discussed above with reference to FIG. 1; however, activity in the digital equivalent of the pupil plane is substantially different from the optical case.

Referring to FIG. 11, the digital processing begins with the sampled image 1110. In one example this sampled image 1110 corresponds to the sampled data set 170 of FIG. 1. In step 1115 the sampled image/data set 1110 is Fourier transformed to produce a transformed data set. The Fourier transform corresponds to Fraunhofer diffraction propagation from the image plane to the lens pupil plane. Thus, the transformed sample data set has a one-to-one correspondence with the light wavefront immediately after the wavefront has passed through the phase modulation plate 130. A function of the digital processing is to distinguish each of the pixel zones 220 of each of the subdivided detectors 210. This is accomplished by replicating the transformed data set. The replicated copies of the transformed data set are then passed in parallel, through separate correlation filters 1125. In the illustrated examples, each detector 210 is subdivided into four pixel zones 220, and accordingly, the transformed data set is replicated three times and passed through four separate correlation filters 1125. Each filter corresponds to a half detector relative image shift in the x and y directions. However, those skilled in the art will appreciate, given the benefit of this disclosure, that the general concept is not limited to subdividing each detector 210 into four pixel zones 220. In practice, the subdivision may be conditioned on the relative size of the lens point spread function and the detector 210. In certain examples, if the lens point spread function is substantially smaller than the detector 210, the system may be configured to extract more than four pixels for a given detector. In this case, more than four correlation filters 1125 would be used. It is further to be appreciated that in examples in which the width of the point spread function is exactly matched to the detector width (so that the maximum signal to noise ratio is obtained), the digital processing discussed herein may not improve the spatial resolution, but may provide a Nyquist sampled image and therefore eliminate aliasing artifacts.

Still referring to FIG. 11, in one embodiment each correlation filter multiplies its copy of the transformed data set by the complex conjugate of the shifted code spread function pattern created during sensor calibration, as discussed further below. Because the optical code spread function pattern has structural details which are substantially finer than the size of the detector 210, each of these four filters may extract information from a different portion of each detector. As a result, a higher resolution final image may be obtained. In addition to compensating for the phase modulation applied by the phase modulator 130 of FIG. 1, the digital correlation filters 1125 may also be configured to reduce the effect of the D.C. offset in the code spread function to an acceptable level, as discussed further below.

After the copies of the transformed data set are correlation filtered (by filters 1125), each set is separately Fourier transformed (step 1135) back to the image plane. The result is four separate sub-images 1120 which have been reconstructed with point spread functions produced by autocorrelation. These sub-images 1120 contain the high spatial frequency information used to resolve objects at the pixel spacing limit. In one example each of these sub-images 1120 will be displaced by half a detector width with respect to each other. These sub-images 120 are then interleaved in step 1145 to create a resulting image 1130 which has four times as many pixels as the focal plane detector array can produce by itself.

According to certain embodiments, additional processing steps 1155, 1165, and 1175 may be added to fully recover a high quality image 1150. The digital correlation filters 1125 may also band pass filter (usually low pass filter) the imagery to reduce, or eliminate, the triangular D.C. pedestal discussed above. The pedestal generally involves low spatial frequency information whereas the high resolution (pixel multiplied) information has high spatial frequency. Accordingly, after reassembly of the fine details of the image, the low spatial frequency information may be restored to avoid distortion of the final image 1150.

Still referring to FIG. 11, interleaving the sub-images 1120 at step 1145 produces a single image 1130 with more effective pixels than the number of detectors 210 in the focal plane array (FPA) 200. This expanded image 1130 resolves fine structure that otherwise would not be visible in a conventional sensor. This image 1130 also has reduced contributions from the filtered spatial frequency components of the original source image, as discussed above. Thus, in order to reestablish this low spatial frequency information, the bandpass filtering in the digital processing may be inverted in the following recovery procedure.

In one embodiment, the recovery procedure begins with delivery of the interleaved imagery (image 1130) to a Fourier transform device where it is transformed (step 1155) back into the spatial frequency domain (i.e. the equivalent of the pupil plane). In step 1165, the resulting data set is passed through a spatial frequency compensation filter, which undoes the bandpass filtering described above. This background filter may be designed to pass only the pedestal portions of the spectrum. In another example, the background filter may undo the bandpass filtering from the filters 1125 and also pass the high spatial frequencies. The reverse filtered result undergoes a second Fourier transform at step 1175 which recreates the image 1140. In examples where the background filter at step 1165 corrects for the D.C. pedestal, and also passes the high spatial frequency information, the reconstructed image 1140 is the finished product (equivalent to final image 1150). In other examples, where only the pedestal information is reconstructed in steps 1155-1175, the reconstructed image 1140 is combined with the interleaved high spatial frequency imagery (from 1130) to produce the composite final image 1150.

As discussed above, the digital correlation filters 1125 may be configured to reduce or eliminate the effects of the pedestal in the code spread function. There are several different bandpass filter profiles which may be implemented, some examples of which are discussed further below. In each of these examples, the filter effectively suppresses the pedestal, and also substantially reduces the low spatial frequencies in the imagery and thereby causes distortion of the image. However, as discussed above, by placing a constraint on these filters the low spatial frequency information can be recovered and the image distortion eliminated. This constraint is that the filters do not reduce the amplitudes of the low frequencies to zero, such that the amplitudes may be restored to their original values using embodiments of the recovery process discussed above. The low spatial frequencies gather their energy from a wide area (many detectors). In contrast, fine detail high spatial frequency information is highly localized. Thus, the signal to noise ratio for the low spatial frequencies is much higher than that of the high spatial frequencies. This high signal to noise ratio allows restoration of the low spatial frequency information by inversion of the bandpass filter, as discussed above.

Figure 12A:
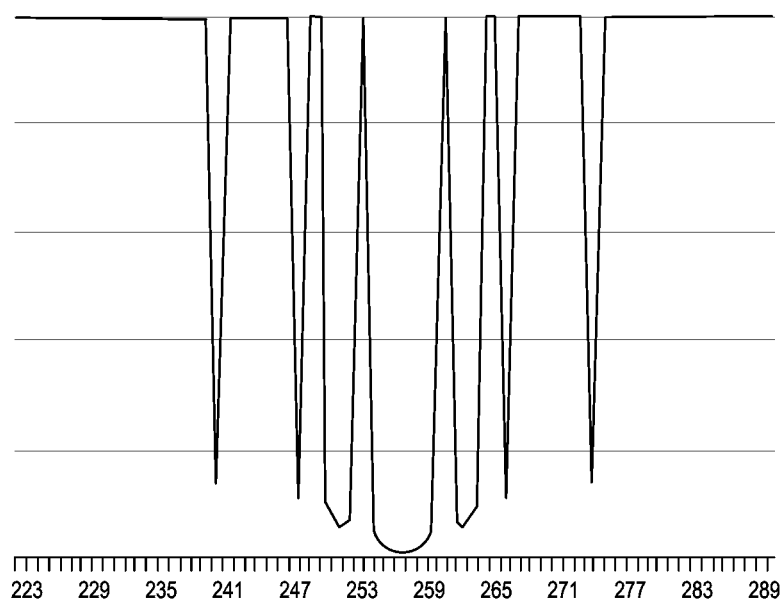
FIG. 12A is a representation of one example of the band pass filter characteristics for an example of a digital filter according to aspects of the invention.
Figure 12B:
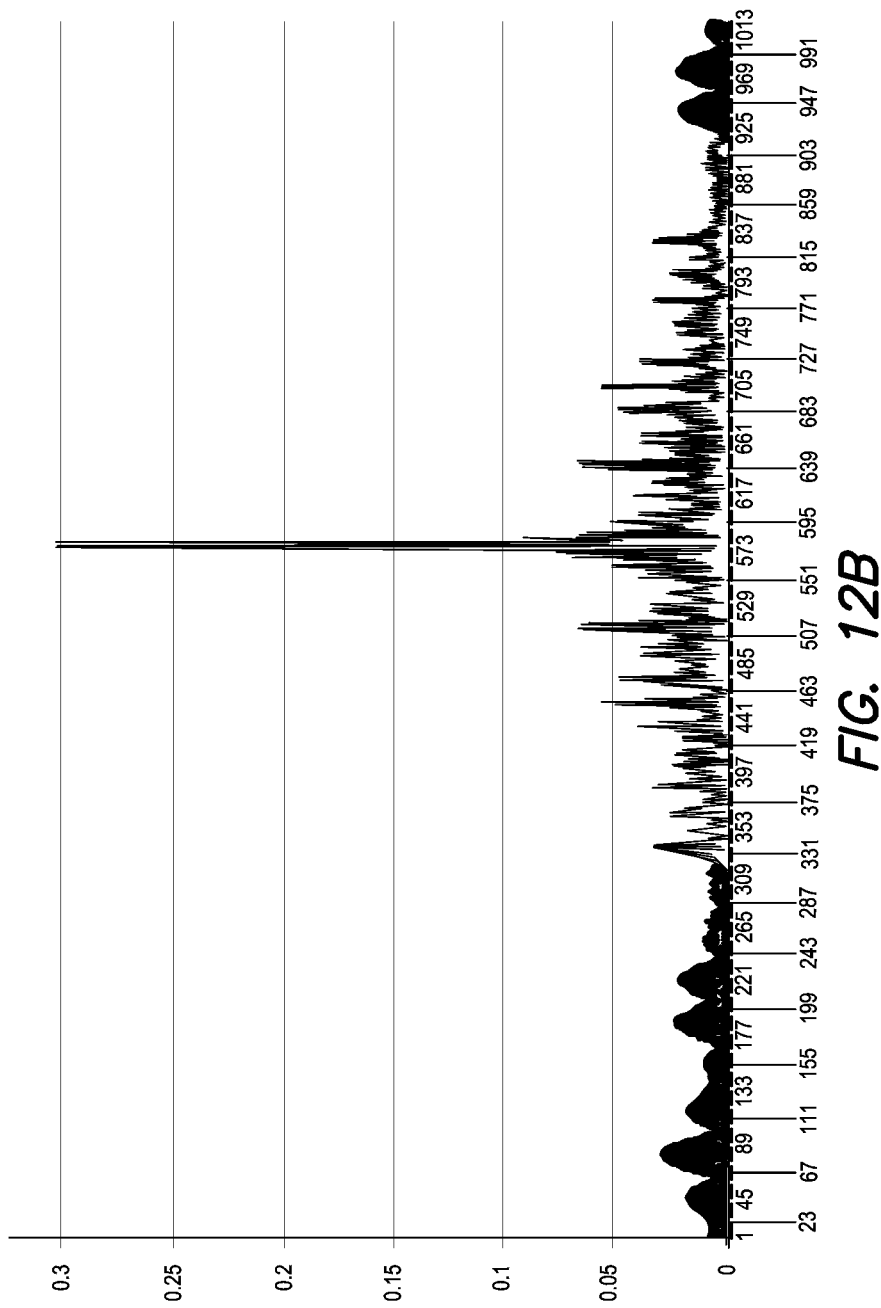
FIG. 12B is a representation of an example of the corresponding reconstruction of a two point image using the filter of FIG. 12A.
Figure 12C:
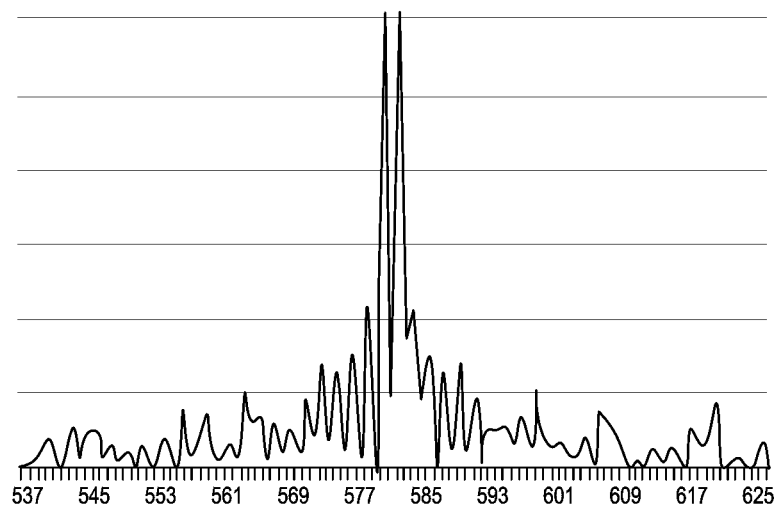
FIG. 12C is an enlarged portion of the image of FIG. 12B.

According to one embodiment, the correlation filters 1125 are configured such that all parts of the Fourier domain sinc function that are above a given threshold are proportionately reduced in value. This technique reduces the intensity of the image in the Fourier domain at areas corresponding to the D.C. pyramid. An example of this technique is illustrated in FIGS. 12A-C. FIG. 12A illustrates an example of the band pass filter characteristics. FIG. 12B illustrates an example of the corresponding reconstruction of a two point image. FIG. 12C is an enlarged portion of the image of FIG. 12B showing the two points (on adjacent detectors) fully resolved. Restoration of the filtered low spatial frequency information may be achieved through inversion of the filter function of FIG. 12A after the separate sub-images 1120 have been interleaved (step 1145), as discussed above. This filtering technique leaves a very small pedestal and very cleanly resolves the two adjacent signals, as demonstrated in FIG. 12C. As will be appreciated by those skilled in the art, given the benefit of this disclosure, the correlation filter design includes adjustable parameters. The example illustrated in FIGS. 12A-C is not necessarily optimized in terms of the effects of adjusting these parameters. Accordingly, this example is illustrative only, and not intended to be definitive. Parameter optimization may improve the images delivered by the correlation filters and digital process.

Figure 13A:
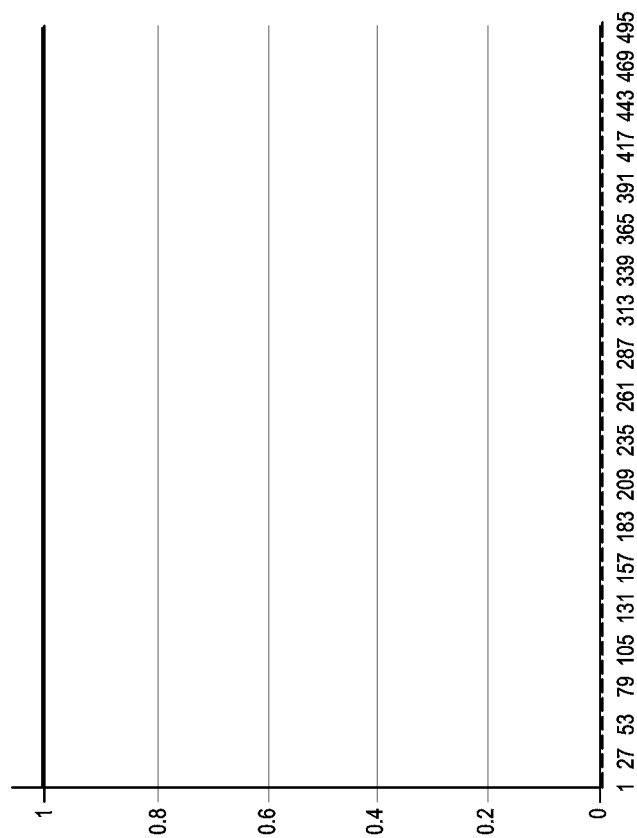
FIG. 13A is a representation of one example of the band pass filter characteristics for another example of a digital filter according to aspects of the invention.
Figure 13B:
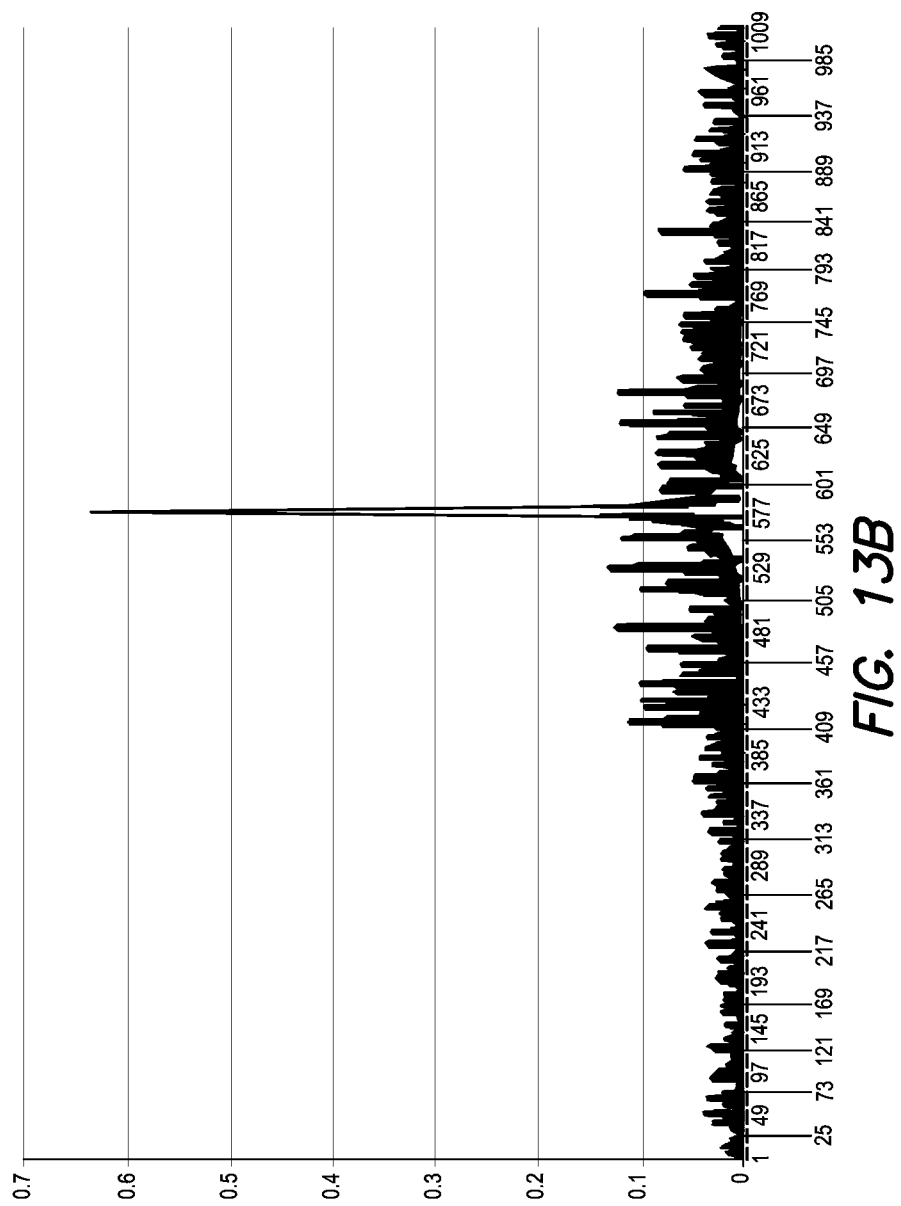
FIG. 13B is a representation of an example of the corresponding reconstruction of a two point image using the filter of FIG. 13A.
Figure 13C:
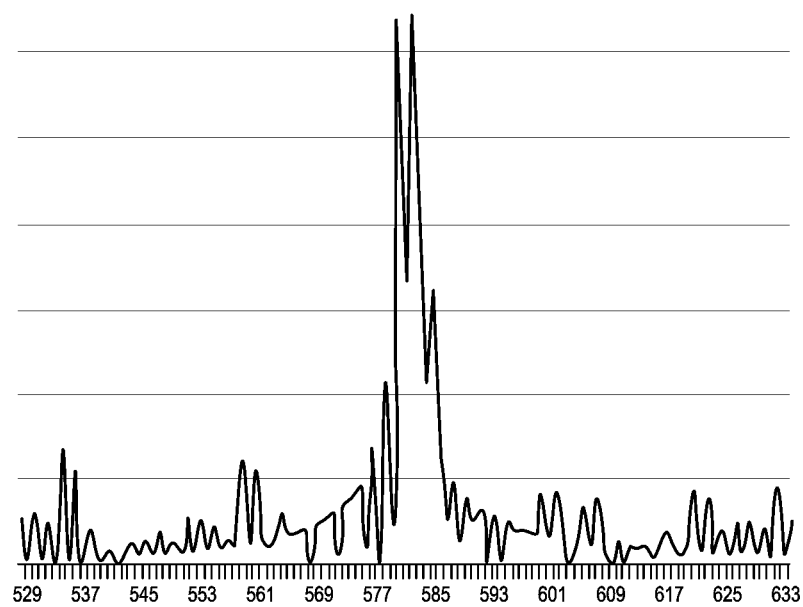
FIG. 13C is an enlarged portion of the image of FIG. 13B.

According to another embodiment, the correlation filters 1125 are configured to set all of the parts of the image and filter spectra to unity magnitude. This filtering technique leaves a flat spectrum after filtering, as shown in FIG. 13A. In other words, the filtering technique delivers a phase-only Fourier spectrum. Without low frequency compensation, the reconstructed image strongly emphasizes the high spatial frequency content of the imagery. Strictly speaking the constant spectrum amplitude of FIG. 13A is produced by non linear filtering since both the correlation filters 1125 and the image data set 1110 are adjusted, frequency by frequency, to produce a flat output spectrum. However, the digital processing remains single pass, with no processing iteration required. FIG. 13A illustrates an example of the corresponding reconstruction of a two point image. FIG. 13C is an enlarged portion of the image of FIG. 13B showing the two points (on adjacent detectors) fully resolved.

Figure 14A:
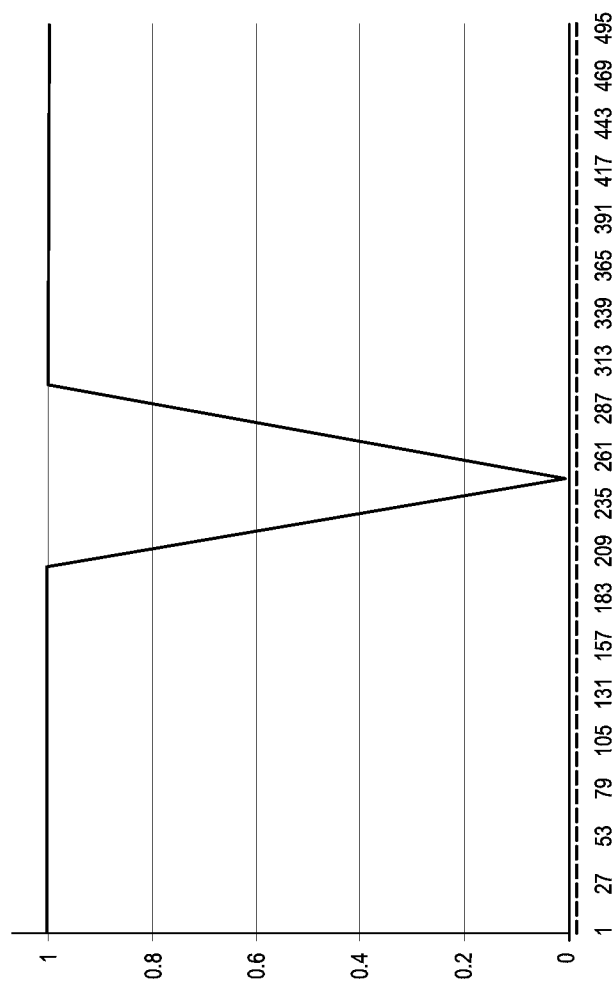
FIG. 14A is a representation of one example of the band pass filter characteristics for another example of a digital filter according to aspects of the invention.
Figure 14B:
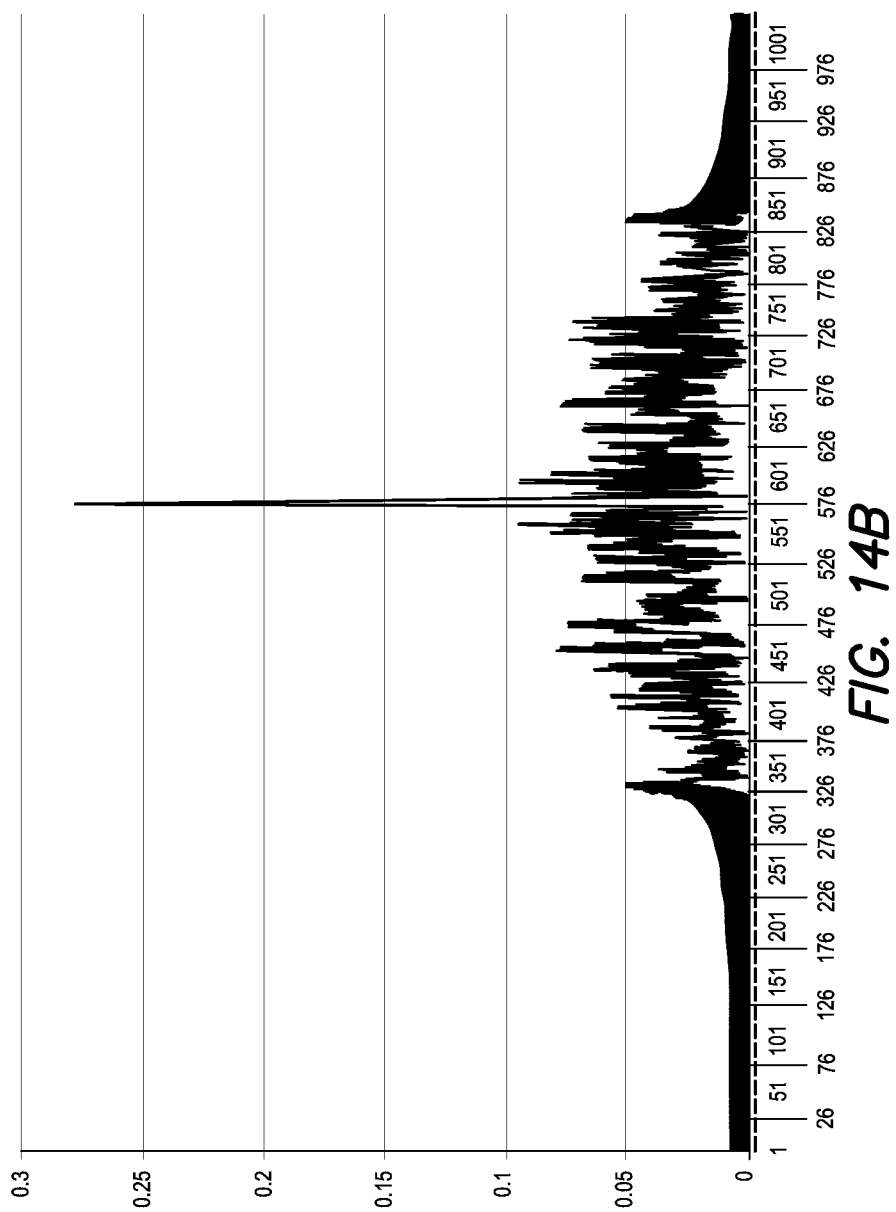
FIG. 14B is a representation of an example of the corresponding reconstruction of a two point image using the filter of FIG. 14A.
Figure 14C:
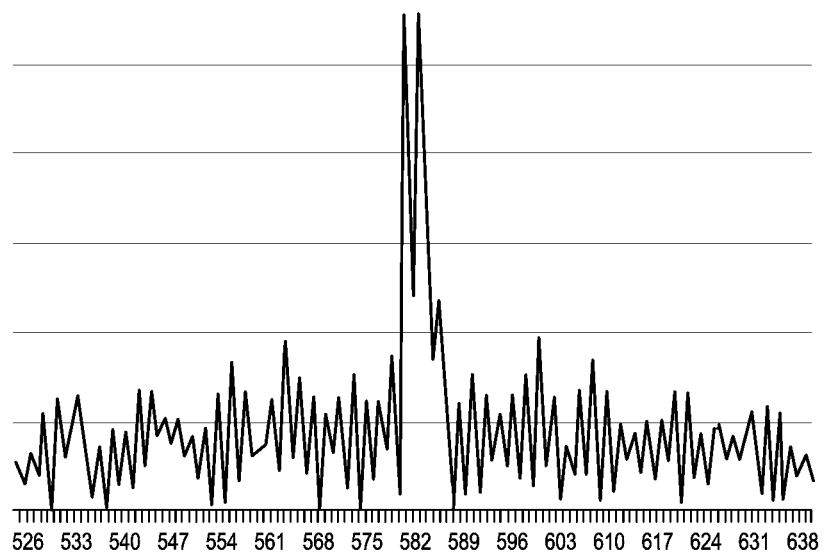
FIG. 14C is an enlarged portion of the image of FIG. 14B.

According to another embodiment, an inverted triangle low pass filter is used to reduce the low spatial frequencies. An example of this technique is illustrated in FIGS. 14A-C. FIG. 14A illustrates an example of the filter profile. The sharp corners of this filter profile may generate some high frequency ringing. FIG. 14B illustrates an example of the corresponding reconstruction of a two point image. As may be seen with reference to FIG. 14B, in this example, the pedestal is not completely eliminated, but is greatly reduced. As will be appreciated by those skilled in the art, given the benefit of this disclosure, this correlation filter design includes adjustable parameters. The example illustrated in FIGS. 14A-C is not necessarily optimized in terms of the effects of adjusting these parameters. Accordingly, this example is illustrative only, and not intended to be definitive. Parameter optimization may improve the images delivered by the correlation filters and digital process.

Figure 15A:
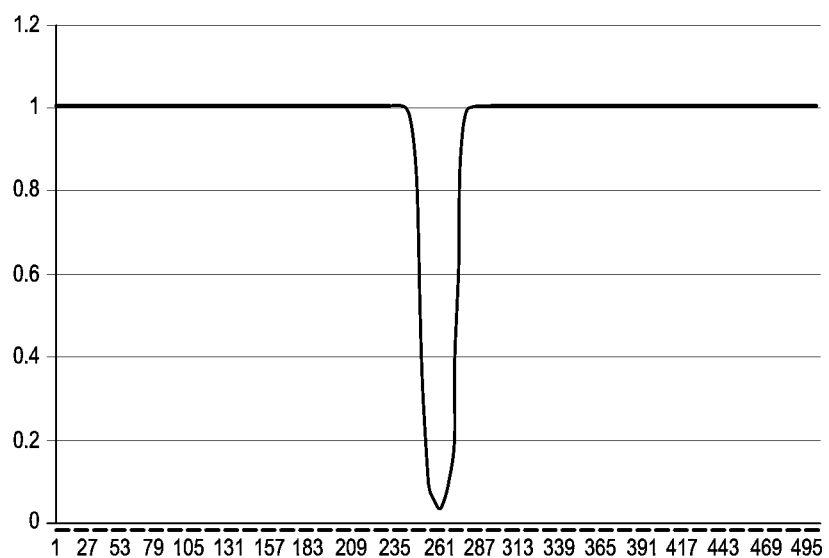
FIG. 15A is a representation of one example of the band pass filter characteristics for another example of a digital filter according to aspects of the invention.
Figure 15B:
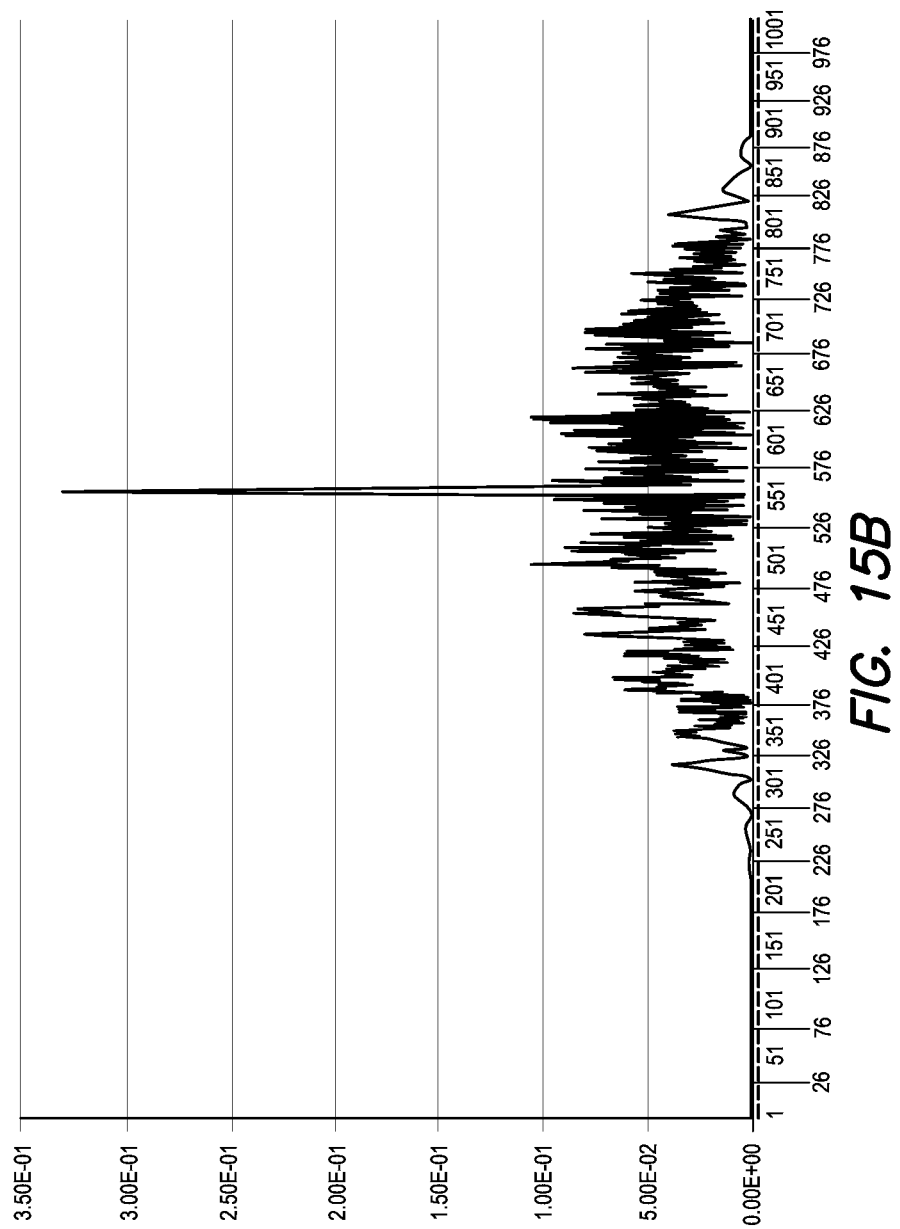
FIG. 15B is a representation of an example of the corresponding reconstruction of a two point image using the filter of FIG. 15A.
Figure 15C:
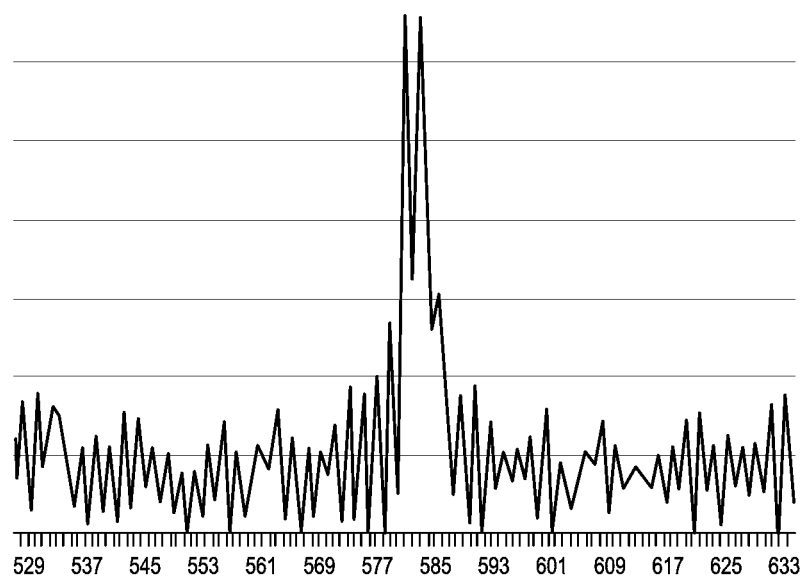
FIG. 15C is an enlarged portion of the image of FIG. 15B.

According to another embodiment, the correlation filters 1125 may be configured with a profile that is an inverted Gaussian function. An example of this technique is illustrated in FIGS. 15A-C. FIG. 15A illustrates an example of the filter profile. The smoothed characteristic of a Gaussian function may reduce the high spatial frequency ringing. FIG. 15B illustrates an example of the corresponding reconstruction of a two point image. As may be seen with reference to FIG. 14B, in this example, the pedestal is not completely eliminated, but is greatly reduced. As will be appreciated by those skilled in the art, given the benefit of this disclosure, this correlation filter design includes adjustable parameters. The example illustrated in FIGS. 15A-C is not necessarily optimized in terms of the effects of adjusting these parameters. Accordingly, this example is illustrative only, and not intended to be definitive. Parameter optimization may improve the images delivered by the correlation filters and digital process.

The above-discussed principles and examples may be demonstrated by digital simulation. In addition, as discussed above, an operations optical/digital sensor system may include an ensemble of digital filters. In both operation and simulation, image reconstruction may be performed with digital processing, as discussed above. According to one embodiment, the code spread function is specified analytically and a phase modulation plate is derived from the analytical code spread function.

Figure 16:
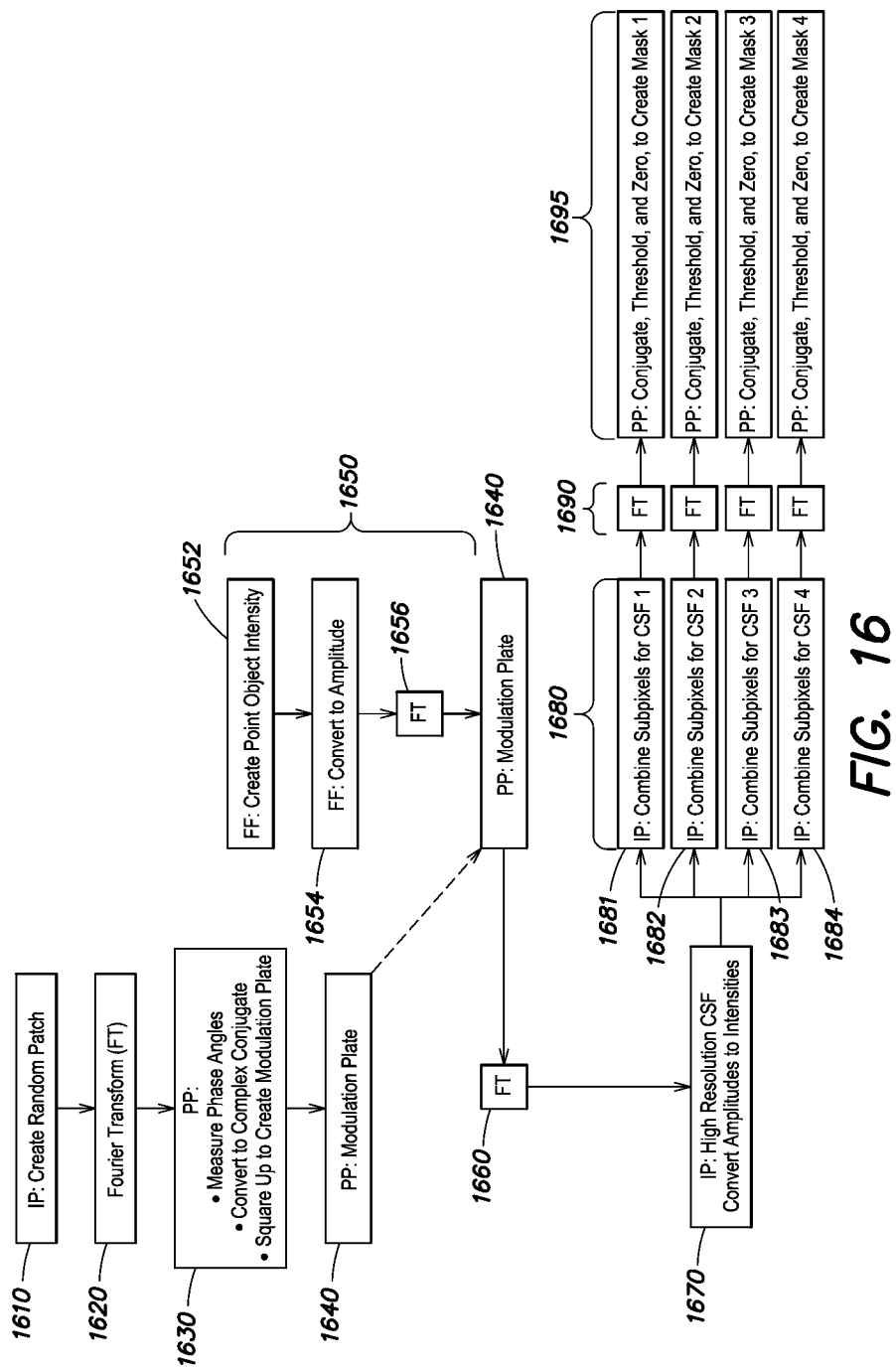
FIG. 16 is a flow diagram of one example of a process for generating digital filters in a digital simulation according to aspects of the invention.

Referring to FIG. 16 there is illustrated one example of a flow diagram for creation of digital filters in a digital simulation. In FIG. 16, FF refers to the far field; PP refers to the pupil plane (at lens 140), which corresponds to the spatial frequency domain; IP refers to the image plane (at the focal plane); and FT is an abbreviation for Fourier Transform. The process begins with creation of a patch 1610 in the image plane (IP). The contents of this patch 1610 may be some complicated function which has a very narrow autocorrelation function. The size of the patch 1610 is determined by a requirement for the signal to sidelobe ratio and by the need to minimize the exclusion zone at the edges of the image. In some examples the patch 1610 is square, however, it need not be. In one example the patch 1610 is filled with uniform distribution random values. In other examples the patch 1610 may include a soft edge windowed function, randomly positioned spikes of unity value or any other complicated function which is narrowly autocorrelated. In certain examples Hadamard functions may be used for the patch 1610.

At step 1620 the patch 1610 is Fourier transformed to create a constrained spatial frequency spectrum function. One example of a compact patch 1610 is a windowed function. The Fourier transform of such a patch is a convolution of the Fourier transformed window with the Fourier transform of the example pseudorandom process. This convolution typically smoothes the Fourier spectrum and leads to wider-spaced oscillations of the Fourier components.

At stage 1630, in the pupil plane (pp), the spectrum representation of the initial image patch may serve as the master pattern for producing a wavefront modulation plate. The spectrum, as transformed from the initial image patch 1610, may have graded amplitude values as well as phase variations. As discussed above, in many cases it may be desirable to have a phase-only modulation plate. Thus, only the phase information in the initial spectrum obtained at step 1620 may be used. One example is a two state phase modulation plate. Such a phase modulation pattern can be derived from the initial image spectrum by splitting the phase region into two complimentary parts and assigning zero phase change to one of these two phase regions and a 180° phase change to the other half. This phase pattern may then be used to define the phase modulation plate 1640.

According to one embodiment, the code spread function may be defined in a multi-step process 1650. In one example this process 1650 begins with a single point object 1652 in the far field source plane, of some intensity. This object 1652 is converted to an amplitude 1654 by taking the square root of the intensity. If the intensity is initially of unit strength, the amplitude will likewise be of unit value. The resulting amplitude spike is propagated to the pupil plane by means of a Fourier transform 1656. In the Fourier domain the amplitude is multiplied by the modulation function of the modulation plate 1640. The resulting modulated amplitude function may be propagated to the image plane by applying an inverse Fourier transform at step 1660. The result of the inverse Fourier transform is a spatially constrained amplitude pattern of complicated and complex form. This amplitude pattern may be converted to an intensity pattern at step 1670 through multiplication with its complex conjugate.

Still referring to FIG. 16, the intensity pattern resulting from step 1670 may have structural variations which are substantially finer than the detector array sample spacing. In one embodiment, from this master intensity pattern a set of displaced and condensed code spread functions 1680 can be extracted. In one example, in which each detector is sub-divided into four sub-pixels, as discussed above, four such code spread functions may be extracted, as shown in FIG. 16. In this case, each "sub-code spread function" corresponds to one of four possible positions of a point object on a detector. Each sub-code spread function may be created by a process of pixel accumulation. For example, four displaced pixels additively contribute to each sub-code spread function. As discussed above, in one example these contributions are from four relatively displaced positions; the displacement distance being one pixel. Table 1 below provides an example of a mechanism by which to calculate the displacements.

TABLE 1

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

Table 1 illustrates a conceptual 3×3 array of detectors, each detector sub-divided into four regions, resulting in a 6×6 array of subpixels. Each conceptual subpixel represents a sample in the two dimensional sample set delivered by the transformative processes leading to step 1670 in FIG. 16. According to one embodiment, the four sub-code spread functions may be created as a generalization of the following scheme:

Referring to Table 1, to produce the first sub-code spread function 1681, add subpixels 11, 12, 21, 22 to produce the first combined sample in the first column, first row. Similarly, add pixels 13, 14, 23, 24 for the second sample in the second column, first row. Add subpixels 31, 32, 41, 42 for the adjacent sample in the first column, second row, etc. This results in the combined subpixel set illustrated by Table 2:

TABLE 2

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

To produce the second sub-code spread function 1682, add pixels 12, 13, 22, 23; 14, 15, 24, 25; 32, 33, 42, 43; etc. This produces a displaced subpixel combination shown in Table 3:

TABLE 3

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

To produce the third sub-code spread function 1683, add subpixels 21, 22, 31, 32; 23, 24, 33, 34; 41, 42, 51, 52; etc. This combination is shown in Table 4:

TABLE 4

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

To produce the fourth sub-code spread function 1684, add subpixels 22, 23, 32 33; 24, 25, 34, 35; 42, 43, 52, 53; etc. This is illustrated by Table 5:

TABLE 5

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

Thus, the sub-code spread functions may be generated from the master image plane, high resolution code spread function obtained at step 1670. As discussed above, from the code spread functions, correlation masks, or digital filters, may be created which operate in the digital Fourier domain. To produce these filters, each of the sub-code spread functions is Fourier transformed at step 1690. At step 1695, the complex conjugates of the spatial frequency spectra produced at step 1690 are generated to create the corresponding correlation mask patterns.

Light propagates as an amplitude, but is detected as an intensity. Fourier transforms may operate on either an amplitude function or an intensity function. It is to be appreciated that to properly simulate a pixel multiplication system and process as discussed above, the Fourier transforms operate on amplitudes when simulating the lens and on intensity when simulating the far field object and the focal plane image. If these transforms are operated correctly, the signal to sidelobe ratio is, to good approximation, the square root of the number of samples in the code spread function patch, whereas the signal to sidelobe ratio may be significantly worse if the transforms are not operated correctly.

Figure 17:
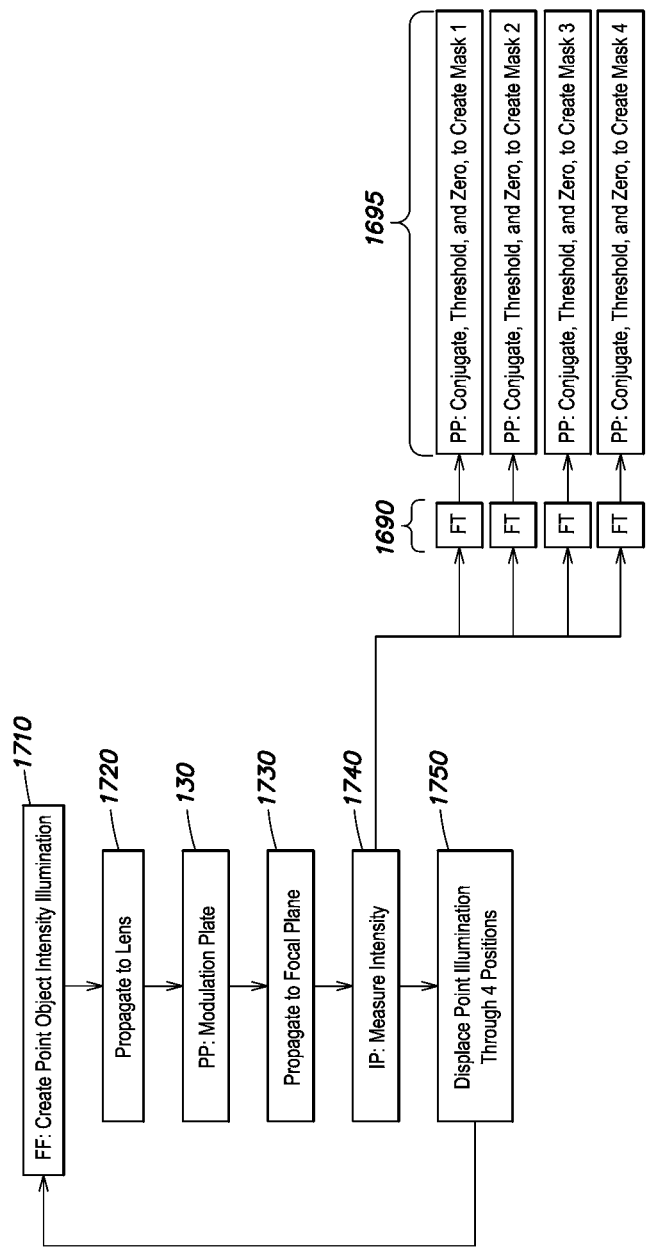
FIG. 17 is a flow diagram corresponding to one example of an optical system for implementing the process of digital correlation filter generation of FIG. 16, according to aspects of the invention.

According to one embodiment, creation of a physical pupil plane modulation plate and digital correlation filters involves both optical measurements and digital processing. FIG. 17 is a flow diagram illustrating an example of an optical system for producing the above-discussed digital correlation filters. In one embodiment, in order to create the sub-code spread function correlation filters (1695), an optical pupil plane phase modulation plate may be produced first. The process for determining the phase pattern of this plate is described above with reference to FIG. 16. After the phase modulation plate 130 has been fabricated, and inserted in the optical system in association with the lens 140, the lens system may be optically calibrated and the digital correlation filter masks may be created.

Referring to FIG. 17, in one embodiment the process of creating the digital correlation filter masks may begin by generating a far field point of light (step 1710). This may be done with a bench collimator. In a point measurement mode, a collimator may emit a plane wave which propagates to the lens (step 1720). In the pupil plane of the lens the wavefront passes through the modulation plane 130, and its spatial phase pattern is appropriately modified. The wavefront further propagates to focus on the focal plane (1730). At the focal plane of the optical system is located an array of detectors which converts the intensity of the light into a sampled data set (step 1740), as discussed above. Multiple data sets may be generated depending on the relative position of the far field point of light in step 1710. Each data set may be generated with the light in a different relative position (step 1750). In one example, the point of light is placed in a position which corresponds to one of the subdivided (sub)pixels of each detector. In the above-discussed example, this positioning produces four positions of the point of the light, with half a detector displacement in the x and y directions, resulting in four data sets.

According to one embodiment, a digital correlation filter is generated for each position of the far field point of light. In one example, the process of filter, or mask, generation is as described above with reference to FIG. 16. Referring to FIG. 17, in step 1690, the data set produced at step 1740 is Fourier transformed to produce spatial frequency spectrum which is in the equivalent of the lens pupil plane. The spectrum undergoes complex conjugation. The amplitudes of the conjugated spectrum may then be adjusted to reduce, or eliminate, those portions of the spectrum which correspond to the D.C. offset pedestal, as discussed above. The result is a pattern, or mask, 1695 which, when multiplied by the spectrum from code spread function modified imagery, may allow reconstruction of the image information contained in one of the pixels in the subdivided detector. Subsequent interleaving of these various sub-detector pixel sets may create a higher resolution image than the original detector array could supply.

As discussed above, an optical system may be implemented which effectively synthesizes a zero average code spread function, thereby avoiding the "pedestal problem." Conventional optical systems project the wavefront amplitude of far field objects onto the focal plane. As noted above, most detection devices measure only the energy, or intensity, of the wavefront, and therefore negative amplitudes are squared by the detector to become positive intensities. This results in a non-zero average function and the D.C. bias or "pedestal problem" discussed above. However, according to certain aspects and embodiments, a device which allows detection of the negative amplitude parts of the wavefront may be implemented, which allows for development of a zero average code spread function. The problem of D.C. bias, and its concomitant pedestal, is thereby eliminated.

Figure 18:
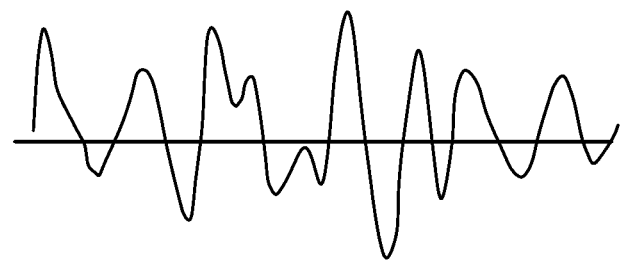
FIG. 18 is a representation of a portion of one example of a code spread function according to aspects of the invention.
Figure 19A:
FIG. 19A is a representation of the positive amplitude portions of the code spread function of FIG. 18.
Figure 19B:
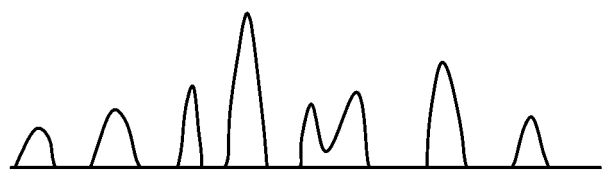
FIG. 19B is a representation of the negative amplitude portions of the code spread function of FIG. 18.

Referring to FIG. 18, it can be seen that the negative portions of the amplitude of the image of the code spread function are located in different spatial locations than are the positive portions of the amplitude. Accordingly, the two different spatial regions may be separately measured. In one example, the code spread amplitude function of FIG. 18 may be partitioned into two spatially distinct regions, as shown in FIGS. 19A and 19B. Thus, separate correlation filters may be constructed for the positive and for the negative regions of the high resolution code spread function. In one example, the code spread function configuration for quadrupling the number of pixels of a detector array may thus use eight, rather than four, digital correlation filters since for each of the four relative filter displacements there will be separate correlation filters for the positive region and for the negative region.

According to one embodiment, partitioning of the code spread function into different spatial regions may be implemented using switchable modulation plates. It may be preferable that the switching mechanism is electrically controlled and relatively fast. In one example low voltage switching employs a liquid crystal as the optical active substance. However, other technologies, such as ferroelectric and micro-electro-mechanical (MEMS) systems may be employed. Technology for electrical switching of spatially patterned phase modulation is well developed for the visible and near infrared portions of the electromagnetic spectrum. Certain liquid crystals may be used to produce a midwave infrared switchable phase modulator. Phase modulation in the long wave infrared spectrum (e.g., 8 to 12 microns) may rely on ferroelectric or MEMS devices.

Figure 20:
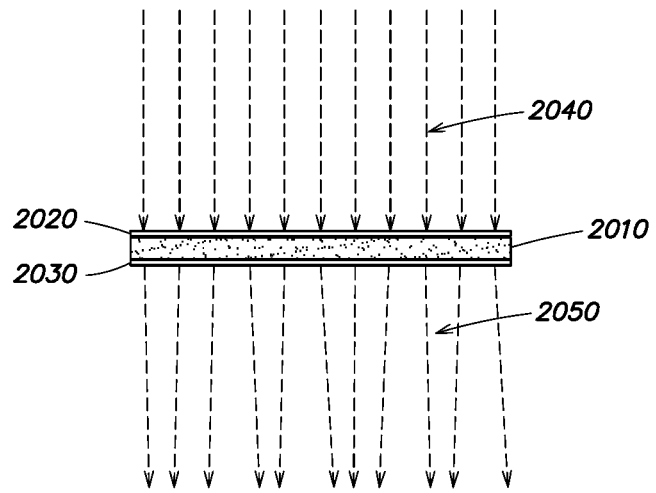
FIG. 20 is a block diagram of one example of a switchable phase modulation plate according to aspects of the invention.

Referring to FIG. 20 there is illustrated a block diagram of one example of a switchable phase modulation plate according to one embodiment. In the illustrated example, the phase modulation plate includes an electro-optically active material 2010 which is placed between two transparent electrodes 2020 and 2030. At least one of the top electrode 2020 and bottom electrode 2030 is spatially patterned so that, when a voltage is applied between the electrodes, the desired spatial pattern of phase modulation is impressed on a light wave that passes through the modulation plate. Thus, incoming light 2040 is spatially modulated to produce two-state, phase modulated outgoing light 2050.

According to one embodiment, the switchable phase modulation plate of FIG. 20 may be used to alternately produce images with a code spread function or with a conventional lens point spread function. In certain examples, this selectibility provides the system with an ability to deliver both unmodified images and images which have twice the spatial resolution, but which accentuate the high spatial frequencies relative to the low spatial frequencies. Combination of these two images may produce a balanced, doubled-resolution image.

Figure 21:
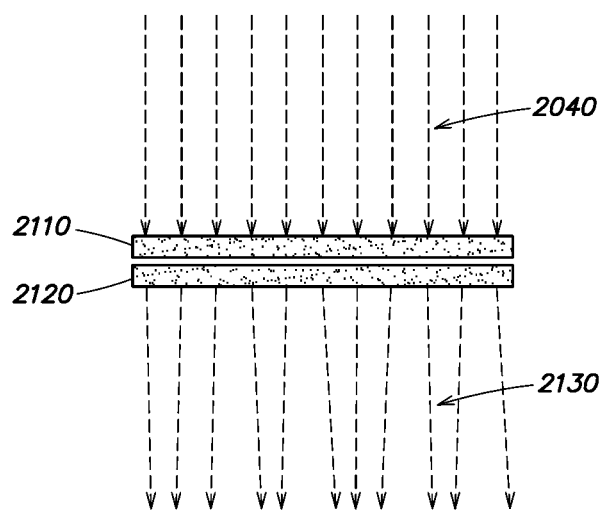
FIG. 21 is a block diagram of another example of a switchable phase modulation plate according to aspects of the invention.

According to another embodiment, stacking two of the switchable modulation plates permits the spatial separation of the positive and negative portions of the code spread function, as discussed above. An example of a configuration of a double stacked modulation plate system is illustrated in FIG. 21. In the illustrated example, the system includes a first switchable phase modulation plate 2110 and a second switchable phase modulation plate 2120. Each plate 2110 and 2120 may switch a different spatial region, for example, corresponding to the positive and negative amplitude regions of the code spread function, as discussed above. In one example, only one of the two modulators 2110 and 2120 is switched on at any given time. In this example, operation of the system produces a three image sequence. Thus, the incoming light 2040 is spatially modulated by the switchable phase modulation plates 2110, 2120 to produce three-state, phase modulated outgoing light 2130.

For example, a first image is generated with both plates 2110 and 2120 switched off. This mode of operation produces the first image at the spatial sampling density of the detector spacings in the focal plane array (FPA). A second image may be generated with the positive code spread function region modulation plate 2110 switched on (while the second modulation plate 2120 remains off). This mode of operation generates the second image corresponding to a partial code spread function for the positive portions of the total code spread function. The high resolution positive region information may be extracted using four correlation filters as described above. A third image may be generated with the positive modulation plate 2110 switched off and the negative region modulation plate 2120 switched on. The negative code spread function region information may be extracted by four correlation filters which are dedicated to the negative information, as discussed above. Subsequently, the two (second and third) high resolution decorrelated images (positive and negative) may be reassembled and combined with the first image to produce a high quality, high resolution, finished image.

It will be appreciated by those skilled in the art, given the benefit of this disclosure, that the digital processing discussed herein is linear in nature. Thus, according to certain embodiments, the recorded, code spread function convolved, imagery may only require one pass through the digital processing to recover the doubled (or otherwise magnified) image resolution. This linearity is in striking contrast to conventional computational imaging techniques which generally involve many iterations to recover a high resolution image. Thus, embodiments of the techniques discussed herein may offer a significant reduction in computational burden.

It is further to be appreciated that the digital processing may be minimized if the code spread function is the same all over the image. For this to be the case, the lens 140 must be isoplanatic and rectilinear. An isoplanatic lens has a point spread function which is the same everywhere in the field of view of the lens. Rectilinearity means that the shape of viewed objects is independent of where the objects are located in the field of view of the lens. Another property of rectilinearity is that the lens does not have barrel, pincushion, or other geometric distortions. However, it is to be appreciated that the techniques discussed herein do not require the lens 140 to be isoplanatic or rectilinear. It may be difficult to achieve a wide field of view with a lens 140 that is both isoplanatic and rectilinear. Accordingly, in certain examples, the pixel multiplication techniques discussed herein may be applied to an image that is locally isoplanatic and rectilinear. In such examples, the image may be made rectilinear by digital manipulation and interpolation. In these examples, the code spread function may vary from region to region; however, its characteristics are measurable in each region. Digital processing may be applied on a regional basis with local code spread functions for each region.

Thus, aspects and embodiments provide processes and systems for implementing pixel multiplication to produce high resolution imagery using single pass correlation techniques. As discussed above, a phase modulation plate may be inserted into the pupil plane of a lens in an optical imaging system. The spatial modulation alters the point spread function of the lens into a more broadly distributed "patch" of point source-originating illumination, referred to herein as a code spread function. The intensity distribution within the code spread function is sharply auto-correlated. Multiple code spread function sampled data sets may be produced through a calibration process wherein a collimated point source is laterally shifted by a fraction of a detector width, as discussed above. These data sets may be used to generate digital correlation filters. Subsequent interleaving of the images produced by these digital correlation filters may result in an image that has increased resolution (e.g., doubled resolution for the case in which each detector is sub-divided into four regions) in the x and y dimensions. In addition, digital filtering provides a mechanism for reducing, or preferably eliminating, the D.C. pedestal that occurs with code spread functions that have non-zero averages. Furthermore, as discussed above, optical techniques, such as the use of a switchable phase modulation plate, may be used to provide a zero-bias code spread function and thereby avoid the pedestal problem.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of pixel multiplication in an optical imaging system comprising:
    receiving a wavefront of electromagnetic radiation at an entrance aperture of the optical imaging system;
    propagating the wavefront to a pupil plane of the optical imaging system;
    modulating the wavefront at the pupil plane with a modulation pattern based on a predetermined code spread function for the optical imaging system to produce a modulated wavefront;
    propagating the modulated wavefront to an imaging detector which includes an array of detector pixels, each pixel having a pixel width;
    sampling the modulated wavefront at the imaging detector to produce a sampled data set; and
    digitally processing the sampled data set the produce an image, the digital processing including:
        replicating the sampled data set to produce at least four sampled data sets;
        individually filtering the at least four sampled data sets in parallel with corresponding digital correlation filters each having a filter function based on a shifted code spread function pattern corresponding to a half pixel width relative shift of the predetermined code spread function on the imaging detector to produce at least four filtered data sets; and
        interleaving the at least four filtered data sets to produce the image.

2. The method of claim 1, wherein propagating the wavefront to the pupil plane of the optical imaging system includes Fourier transforming the wavefront.

3. The method of claim 2, wherein propagating the modulated wavefront to the imaging detector includes Fourier transforming the modulated wavefront.

4. The method of claim 1, wherein digital processing the sampled data set further includes Fourier transforming the sampled data set to produce a transformed data set; and
    wherein replicating the sampled data includes replicating the transformed data set.

5. The method of claim 4, wherein filtering the at least four sampled data sets includes multiplying each sampled data set by a complex conjugate of the corresponding shifted code spread function pattern.

6. The method of claim 4, wherein the predetermined code spread function has a non-zero average value, and wherein the digital processing further includes band pass filtering the image to produce a filtered image.

7. The method of claim 6, wherein the digital processing further includes applying a recovery process to the filtered image to recover low spatial frequency information, the recovery processing including:
    Fourier transforming the filtered image to produced a transformed image data set;
    passing the transformed image data set through a spatial frequency compensation filter to produce a filtered data set; and
    Fourier transforming the filtered data set to recreate the image.

8. The method of claim 1, further comprising generating the predetermined code spread function by:
    converting a point object having a predetermined intensity to an amplitude function;

propagating the amplitude function to the pupil plane by Fourier transforming the amplitude function;

in the Fourier domain, multiplying the amplitude function by the modulation pattern to produce a modulated function;

propagating the modulated amplitude function to an image plane of the imaging detector by applying an inverse Fourier transform to produce a spatially constrained amplitude pattern; and converting the spatially constrained amplitude pattern to an intensity pattern though multiplication of the spatially constrained amplitude pattern with its complex conjugate to produce the code spread function.

9. The method of claim 8, further comprising partitioning the amplitude function in the image plane into two spatially distinct regions.

10. The method of claim 9, further comprising selectively activating an electro-optically active material to apply the modulation pattern to one of the two spatially distinct regions in the image plane.

11. An imaging apparatus comprising:
an imaging detector array including a plurality of pixels, each having a pixel width;
a lens configured to receive an electromagnetic wavefront from a distant scene;
a modulation plate positioned at a pupil plane of the lens and configured to modulate the wavefront with a modulation pattern based on a predetermined code spread function for the lens to produce a modulated wavefront, the lens being further configured to focus the modulated wavefront onto a focal plane of the imaging detector array, and the imaging detector array configured to sample the modulated wavefront to produce a sampled data set; and
a digital image processor coupled to the imaging detector array and configured to digitally process the sampled data set to produce an image of the scene, the digital processor configured to replicate the sampled data set to produce at least two sampled data sets, and including at least two digital correlation filters each having a filter function based on a shifted code spread function pattern corresponding to a half pixel width relative shift of the predetermined code spread function on the imaging detector array and configured to filter a corresponding one of the at least two sampled data sets to produce at least two filtered data sets, wherein the digital image processor is further configured to interleave the at least two filtered data sets to produce the image of the scene.

12. The imaging apparatus of claim 11, wherein the predetermined code spread function has a non-zero average value, and wherein the digital image processor further includes a band pass filter configured to filter the image to produce a filtered image.

13. The imaging apparatus of claim 11, wherein the modulation plate is a phase modulation plate.

14. The imaging apparatus of claim 11, wherein the modulation plate is a switchable modulation plate including an electro-optically active material and a pair of optically transparent electrodes positioned on either side of the electro-optically active material.

15. The imaging apparatus of claim 14, wherein the switchable modulation plate is a first switchable modulation plate, and further comprising:
a second switchable modulation plate stacked with the first switchable modulation plate; and
a controller coupled to the first and second switchable modulation plates and configured to alternately switch on the first and second switchable modulation plates.

16. An imaging apparatus comprising:
an imaging detector array including a plurality of pixels, each having a pixel width;
a lens configured to receive an electromagnetic wavefront from a distant scene;
a switchable modulation plate including an electro-optically active material and a pair of optically transparent electrodes positioned on either side of the electro-optically active material, the switchable modulation plate positioned at a pupil plane of the lens and configured to modulate the wavefront with a modulation pattern based on a predetermined code spread function for the lens to produce a modulated wavefront, the lens being further configured to focus the modulated wavefront onto a focal plane of the imaging detector array, and the imaging detector array configured to sample the modulated wavefront to produce a sampled data set; and
a digital image processor coupled to the imaging detector array and configured to digitally process the sampled data set to produce an image of the scene, the digital processor configured to replicate the sampled data set to produce at least two sampled data sets, and including at least two digital correlation filters each having a filter function based on the predetermined code spread function and configured to filter a corresponding one of the at least two sampled data sets to produce at least two filtered data sets, wherein the digital image processor is further configured to interleave the at least two filtered data sets to produce the image of the scene.

17. The imaging apparatus of claim 16, wherein the switchable modulation plate is a first switchable modulation plate, and further comprising:
a second switchable modulation plate stacked with the first switchable modulation plate; and
a controller coupled to the first and second switchable modulation plates and configured to alternately switch on the first and second switchable modulation plates.

18. A method of pixel multiplication in an optical imaging system comprising:
generating a predetermined code spread function by:
converting a point object having a predetermined intensity to an amplitude function;
propagating the amplitude function to a pupil plane by Fourier transforming the amplitude function;
multiplying the amplitude function by a modulation pattern to produce a modulated function in the Fourier domain;
propagating the modulated amplitude function to an image plane of an imaging detector by applying an inverse Fourier transform to produce a spatially constrained amplitude pattern; and
converting the spatially constrained amplitude pattern to an intensity pattern though multiplication of the spatially constrained amplitude pattern with its complex conjugate to produce the code spread function;
receiving a wavefront of electromagnetic radiation at an entrance aperture of the optical imaging system;
propagating the wavefront to a pupil plane of the optical imaging system;
modulating the wavefront at the pupil plane with the modulation pattern based on the predetermined code spread function for the optical imaging system to produce a modulated wavefront;

propagating the modulated wavefront to an imaging detector which includes an array of detector pixels, each pixel having a pixel width;

sampling the modulated wavefront at the imaging detector to produce a sampled data set; and digitally processing the sampled data set the produce an image, the digital processing including:
- replicating the sampled data set to produce at least two sampled data sets;
- individually filtering the at least two sampled data sets in parallel with corresponding digital correlation filters each having a filter function based on the predetermined code spread function to produce at least two filtered data sets; and
- interleaving the at least two filtered data sets to produce the image.

19. The method of claim 18, further comprising partitioning the amplitude function in the image plane into two spatially distinct regions.

20. The method of claim 19, further comprising selectively activating an electro-optically active material to apply the modulation pattern to one of the two spatially distinct regions in the image plane.

* * * * *